Figure 1:
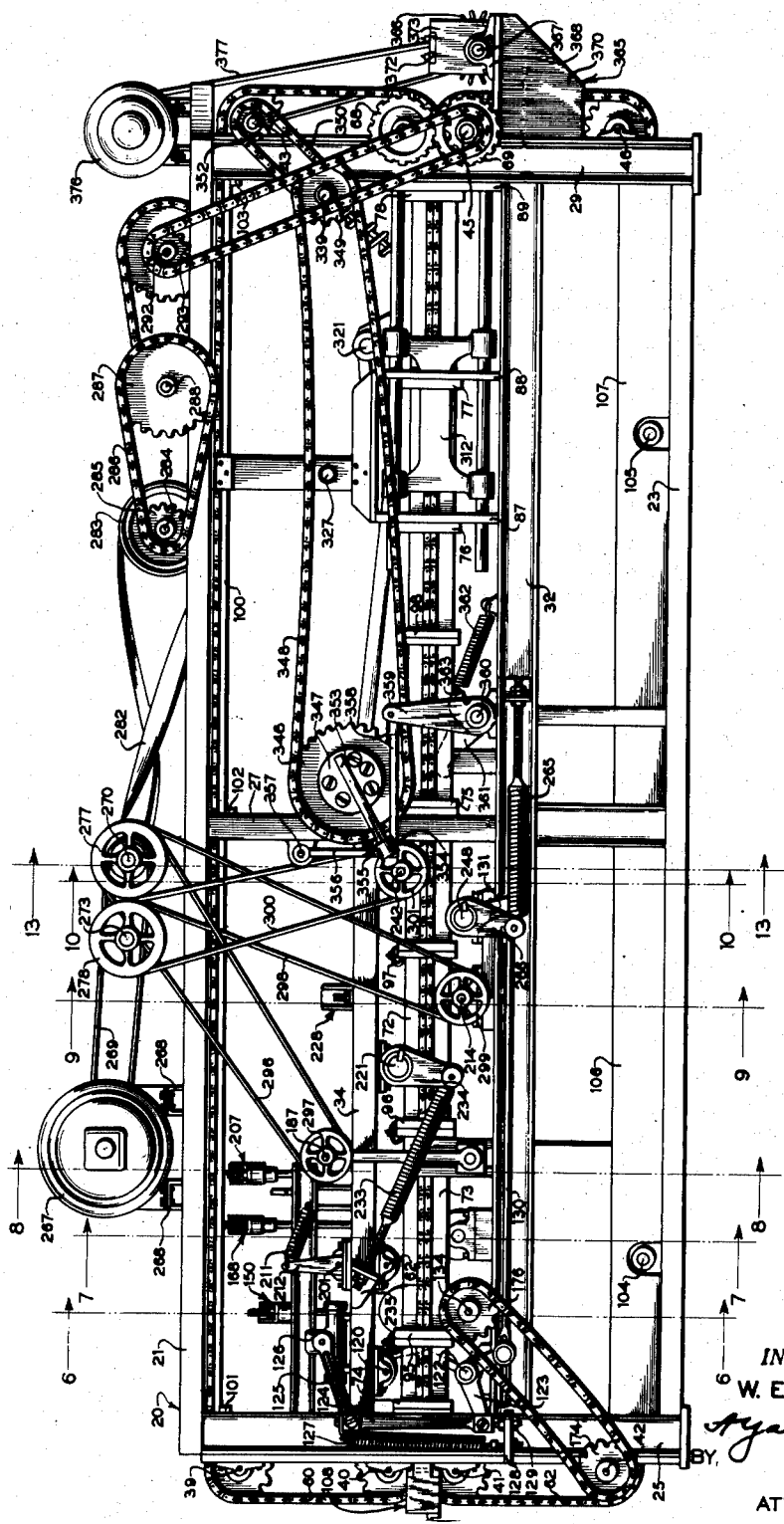

Oct. 13, 1953     W. E. WRIGHT     2,654,915
DECORTICATOR

Filed June 18, 1946     17 Sheets-Sheet 1

INVENTOR.
W. E. WRIGHT
ATTORNEY

INVENTOR.
W. E. WRIGHT
ATTORNEY

Oct. 13, 1953　　　W. E. WRIGHT　　　2,654,915
DECORTICATOR
Filed June 18, 1946　　　　　　　　　　　17 Sheets-Sheet 4

INVENTOR.
W. E. WRIGHT
BY
ATTORNEY

Oct. 13, 1953   W. E. WRIGHT   2,654,915
DECORTICATOR
Filed June 18, 1946   17 Sheets-Sheet 7

INVENTOR.
W. E. WRIGHT
BY
*H. Yates Dowell*
ATTORNEY

Oct. 13, 1953  W. E. WRIGHT  2,654,915
DECORTICATOR

Filed June 18, 1946  17 Sheets-Sheet 8

INVENTOR.
W. E. WRIGHT
BY
A. Yates Dowell.
ATTORNEY

Oct. 13, 1953  W. E. WRIGHT  2,654,915
DECORTICATOR

Filed June 18, 1946  17 Sheets-Sheet 11

INVENTOR.
W. E. WRIGHT
BY
ATTORNEY

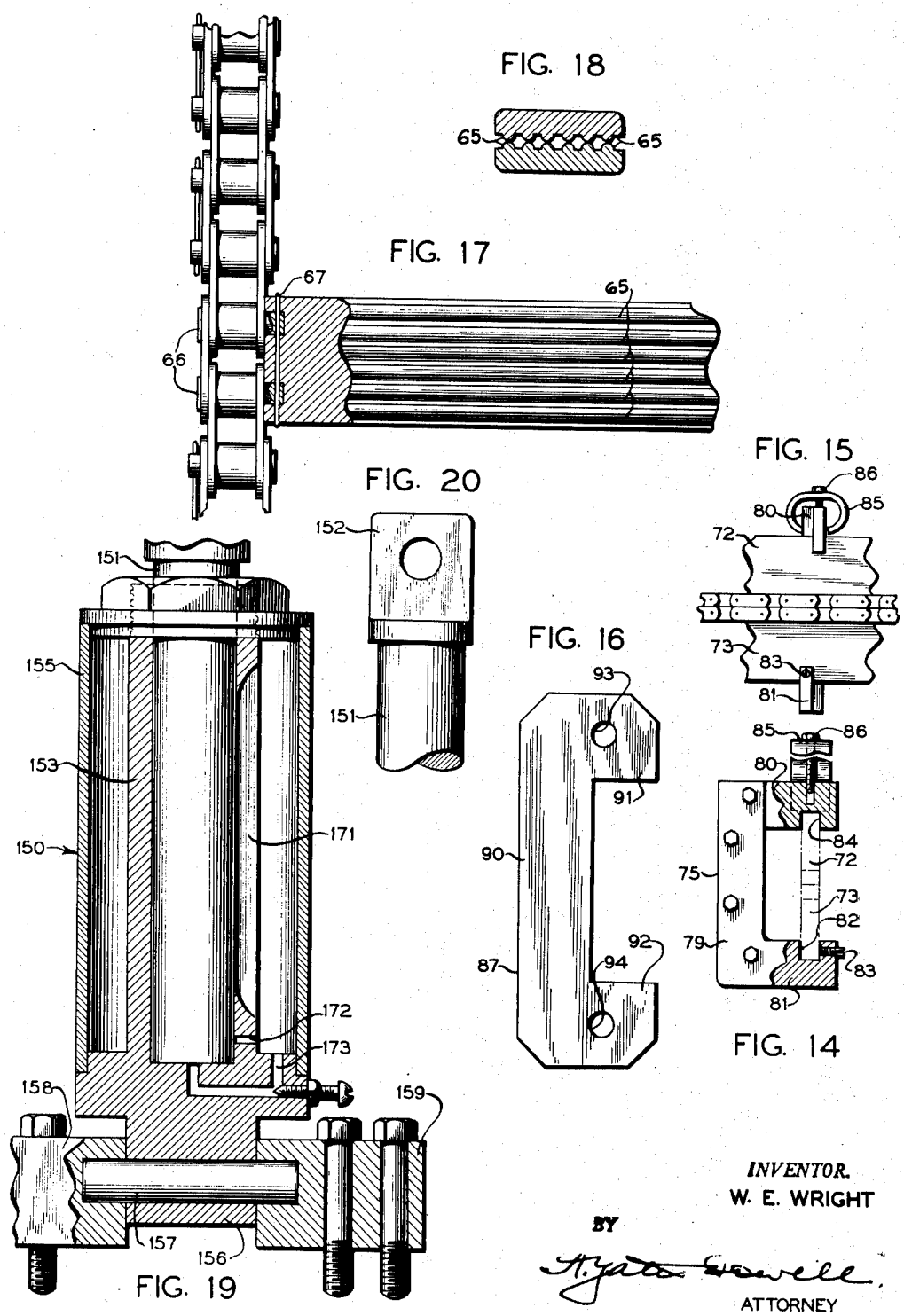

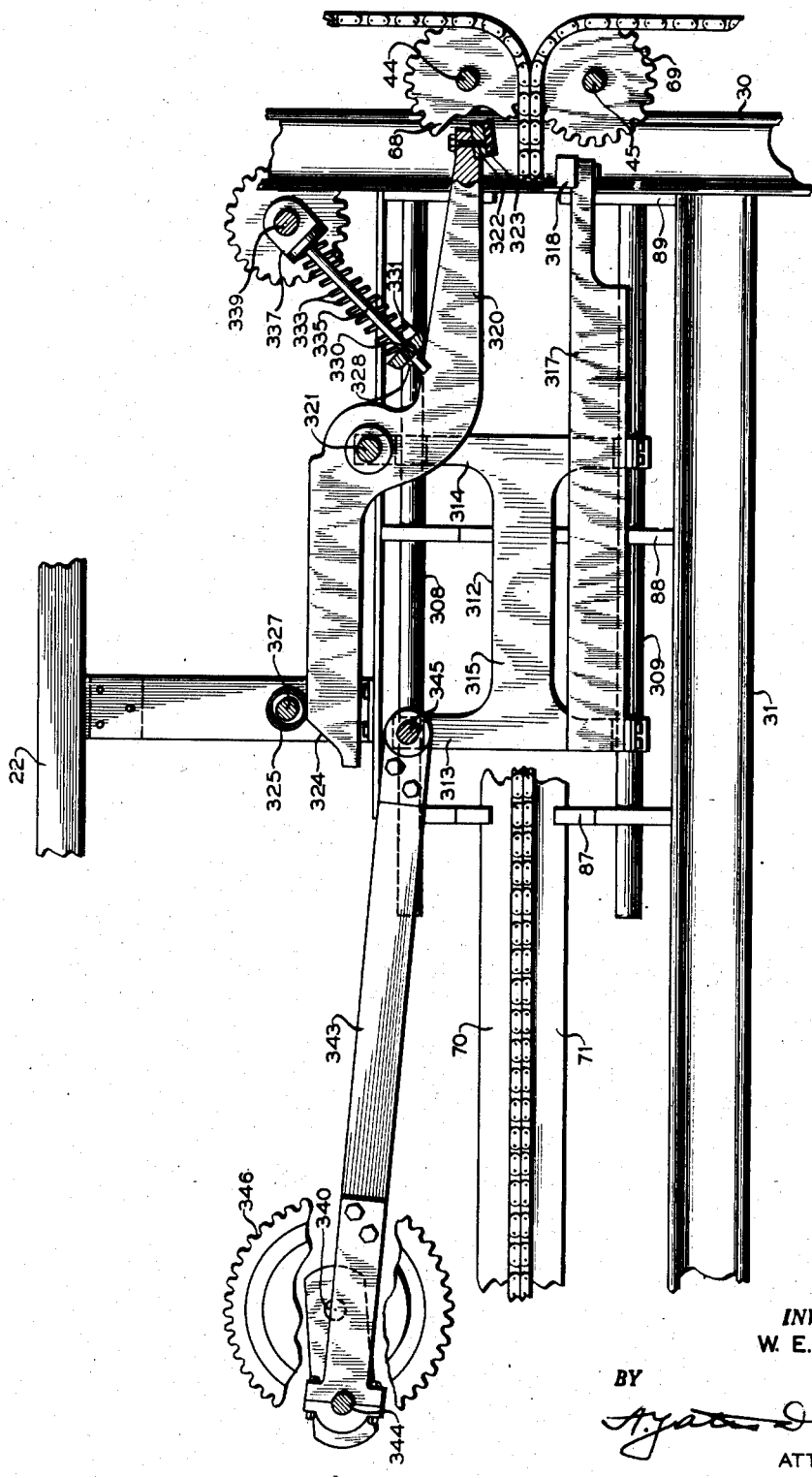

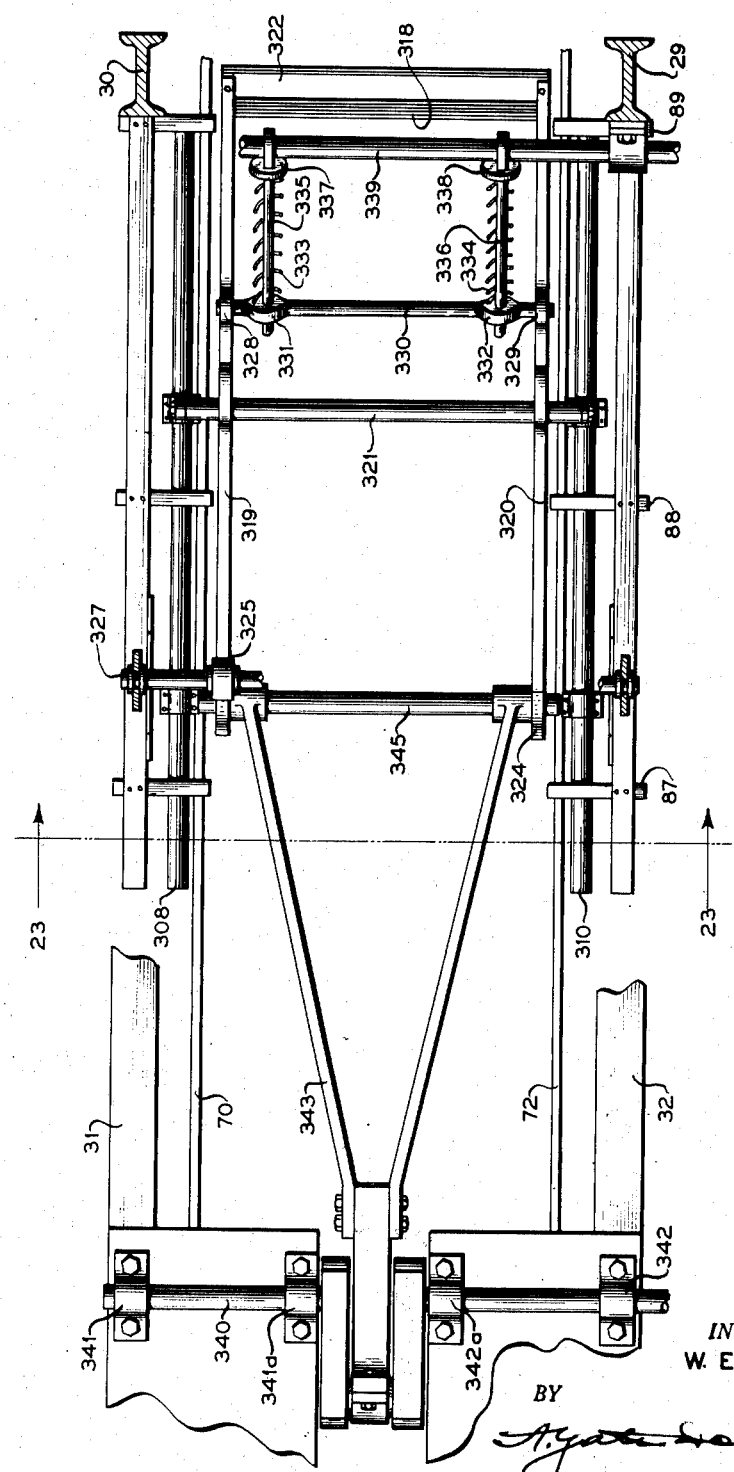

Oct. 13, 1953     W. E. WRIGHT     2,654,915
DECORTICATOR

Filed June 18, 1946     17 Sheets-Sheet 15

INVENTOR.
W. E. WRIGHT
BY
ATTORNEY

Oct. 13, 1953 W. E. WRIGHT 2,654,915
DECORTICATOR
Filed June 18, 1946 17 Sheets-Sheet 17

INVENTOR.
W. E. WRIGHT
BY
ATTORNEY

Patented Oct. 13, 1953

2,654,915

UNITED STATES PATENT OFFICE 2,654,915

DECORTICATOR

William E. Wright, West Palm Beach, Fla., assignor to Sea Island Mills, Inc., New York, N. Y.

Application June 18, 1946, Serial No. 677,537

58 Claims. (Cl. 19—11)

This invention relates to improvements in the production of vegetable fiber and particularly to improved method and apparatus for preparing fiber of high commercial quality from the ramie plant and to an improved fiber product.

The use of ramie fiber apparently originated in the orient and hand cleaned fiber known commerically as "China glass" was imported into this country for many years up until the time such imports were cut off by military activities in China. This hand cleaned Chinese fiber was not sufficiently free of bark and other parts of the plants and was not received in sufficient quantity to achieve wide use in the textile industry. It has been known to Oriental peoples, however, since antiquity as a source of fiber for domestic cloth.

The Japanese appreciated, to some extent at least, the textile possibilities of the fiber and attempted to prefect a method and apparatus for cleaning the fiber on a commercial basis. These efforts resulted in the production of a small and simple cleaning machine, the operation of which involved an amount of manual labor only slightly less than that involved in the hand cleaning method of the Chinese. In using the Japanese machine, an operator holds a few ramie stalks in his hands and feeds them into the machine for about half their length, withdraws and reverses them and feeds in and withdraws the remaining portions. This method also occasions an important loss of fiber in addition to the disadvantage of requiring an excessive amount of hand labor in removing the leaves and other green matter, feeding the stalks and removing adhering stalk material from the fiber.

Following the Japanese attempts several efforts have been made in this country to produce apparatus that would successfully clean ramie fiber. These efforts have been chiefly directed along two lines. In one type of machine the stalks are mechanically gripped at approximately their mid length location and are carried through narrow slots in which they are subjected to the scraping action of large cleated wheels. The butt end portions alone are carried through the first slot and the partially cleaned butt end portions and the top end portions are carried through the second slot. This apparatus loses up to one half of the fiber in the butt end portions, which contain the most mature and commercially desirable fiber, and produces a fiber mass that is tangled and ruffed and therefore difficult to separate and card.

The second type of apparatus subjects the stalks to the action of crushing, breaking and scraping rollers as the stalks pass freely therethrough, and fails to clean the fiber sufficiently to render it commercially usable and also tangles and knots the fiber.

These devices are not only heavy and cumbersome and difficult to adjust and operate but have also been designed as general purpose decorticating machines rather than as specialized machines particularly adapted to cleaning ramie fiber.

In a great many types of commercial vegetable fiber, such as hemp, jute, sisal and linen, the nonfibrous plant material is rotted away from the fiber and can be readily removed by a comparatively simple squeezing and scraping process and a long time interval may elapse between the times of cutting the plants and cleaning fiber.

Ramie fiber, however, must be cleaned within a few hours of cutting the plants as a fiber destroying ferment, apparently of enzymic character, begins soon after the plants are cut and the organic gums and resins in the plant also harden and become comparatively insoluble. This requires that the ramie decorticating apparatus be used at the location at which the plants are grown.

As ramie is a tropical plant growing best in damp or swampy soil, the decorticating apparatus must be used in locations where very little skilled labor is available and where it is subject to adverse climatic conditions. To meet these conditions the apparatus must be reasonably easy to transport and assemble, must be as completely automatic in operation as possible, must have little tendency to get out of adjustment and must not be unduly subject to breakage during operation.

The main deficiency of the various types of decorticating apparatus already proposed as applied to cleaning ramie fiber is that they do not operate in a manner specifically applicable to the peculiar structure of the ramie plant and the special conditions under which the fiber cleaning operation must be carried out.

As pointed out above, it is necessary to clean the fiber within a few hours after the plants are cut and while they are still in a green condition.

The ramie plant comprises a substantially cylindrical stalk without branches having a length from two and a half to six and a half feet and a butt end diameter of from one-fourth to three-quarters of an inch or slightly larger. The leaves grow directly from the upper portion of the stalk and there is an immature top portion that has to be removed and discarded along with the leaves. The leaves and tops are valuable as stock feed provided they are not mixed with fiber or the woody portions of the plants.

The stalk itself comprises a tubular shell of woody cellulosic material filled with a soft pith and covered by an inner bark and an outer bark. The fiber is contained in the inner bark, some of which lies in longitudinal grooves or creases in the outer surface of the tubular shell. The outer bark is a relatively thin membrane which can be easily scraped from the green stalks.

The fiber is present in lengths of from around three-quarters inch up to about nine inches in length and apparently grows upwardly from the shell toward the outer bark. It has been found that a scraping operation in a direction away from the butt end of the stalk removes non-fibrous plant material while maintaining the fibers in a smooth and parallel condition. Any scraping action in the opposite direction tends to push the fibers back on themselves in a fluffing manner, and tear a number of the fibers from the fiber ribbon. This results in a ribbon of snarled and tangled fibers and a considerable loss of fiber and particularly of the commercially desirable fiber located along the butt end portion of the stalk. It has also been found that unless the butt end portions of the stalks are securely held during the cleaning operation it is not possible to produce straight clean fiber ribbons and that there is a considerable loss of fiber and severing of the fiber in the ribbons.

As the usable dried fiber amounts to only about four percent of the green weight of the stalks, any material loss of fiber is extremely important from a commercial viewpoint.

After the fiber has been cleaned and dried it is put through a degumming process which dissolves the organic gums and resins in which the fiber is embedded in the fiber ribbons. The fibers are then separated and carded according to usual textile methods and may be subsequently bleached, dyed, spun and woven as may be desired.

In order that the fiber separating and carding apparatus may operate successfully on the long staple fiber which the ramie plant produces it is desirable that the fibers should be substantially parallel in relatively straight ribbons at the conclusion of the decorticating process and it is also highly desirable that these ribbons should contain substantially all of the usable fiber in the stalks.

It is therefore among the objects of the present invention to provide improved decorticating apparatus especially adapted for cleaning ramie fiber which will produce relatively straight, thoroughly cleaned ribbons of substantially parallel fibers without material loss of commercially usable fiber.

A further object resides in the provision of an improved method of cleaning ramie fiber wherein the cleaning operations are performed in a direction away from the butt ends of the ramie stalks to produce relatively straight, thoroughly cleaned ribbons of substantially parallel ramie fibers.

A still further object resides in the provision of an improved ramie fiber product comprising relatively straight ribbons of substantially parallel fibers containing only fiber and a small amount of soluble gums and resins and containing substantially all of the usable fiber in the ramie stalks.

A more specific object resides in the provision of improved decorticating apparatus particularly adapted to cleaning ramie fiber wherein the ramie stalks are gripped at their butt end portions and held thereby as they are carried through various stages of the fiber cleaning mechanism.

A further object resides in the provision of improved decorticating apparatus especially adapted to cleaning ramie fiber which cleans the major portions of the stalks and short lengths of the stalks at the butt end portions in separate cleaning operations in order to clean the fiber from the entire stalk with a minimum loss of usable fiber.

Another object resides in the provision of improved ramie decorticating apparatus which receives the entire plant including leaves and tops and delivers the fiber, the leaves and the remaining plant material at different respective locations without the necessity of hand labor whereby the leaves and fiber are separated from each other and from the rest of the plant material, and the green material may then be salvaged as a byproduct to the fiber.

Still another object resides in the provision of improved decorticating apparatus which may be provided in decorticating units several of which may be combined to provide a machine of any desired capacity within wide limits.

Other objects and advantages will become apparent as the description proceeds in connection with the accompanying drawings.

Figure 2:
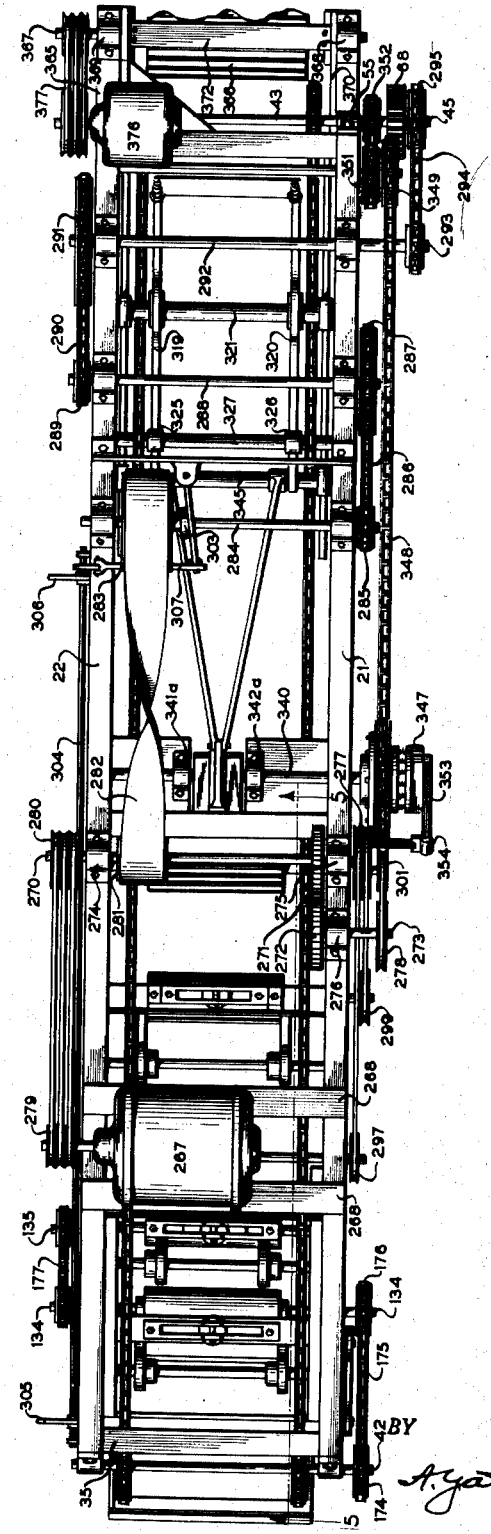
Figure 3:
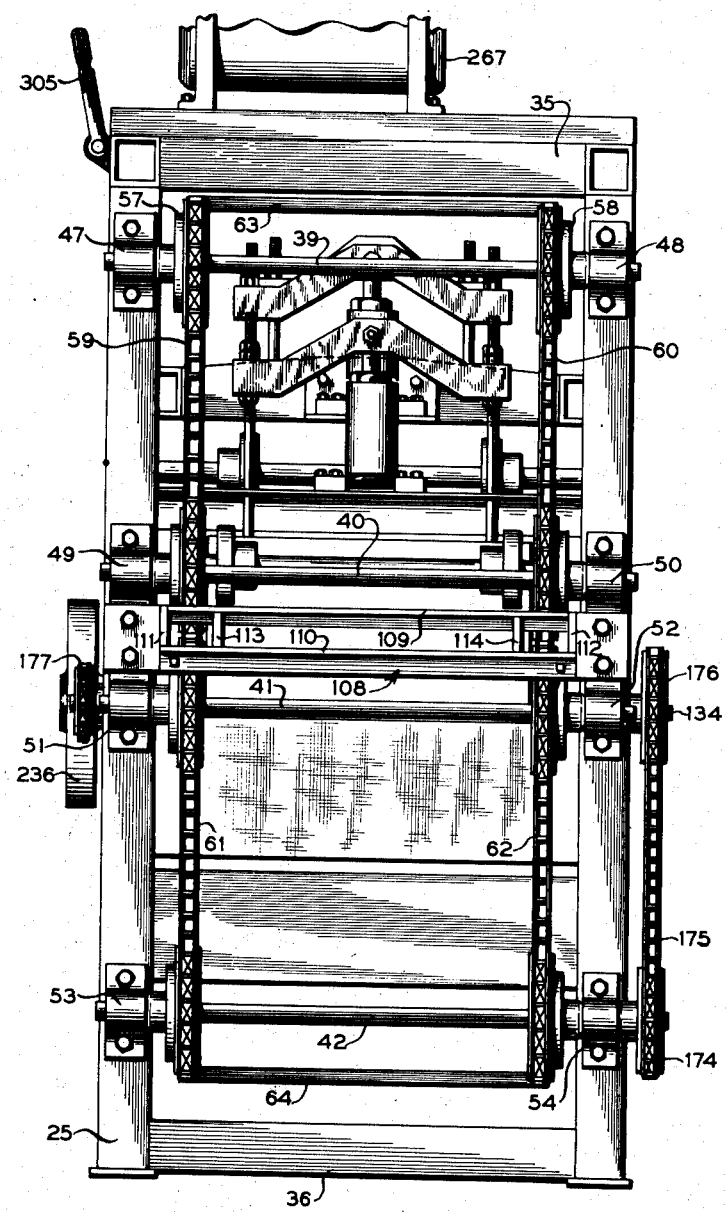
Figure 4:
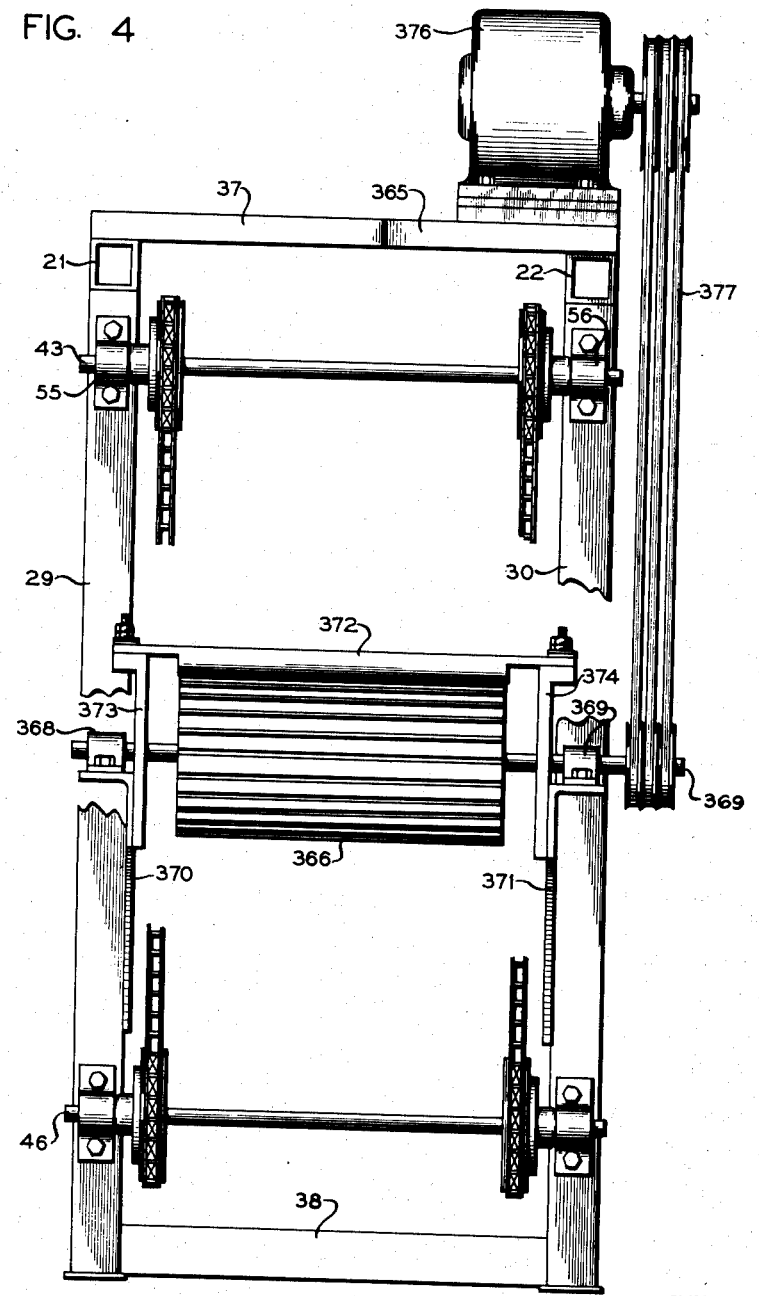
Figure 5:
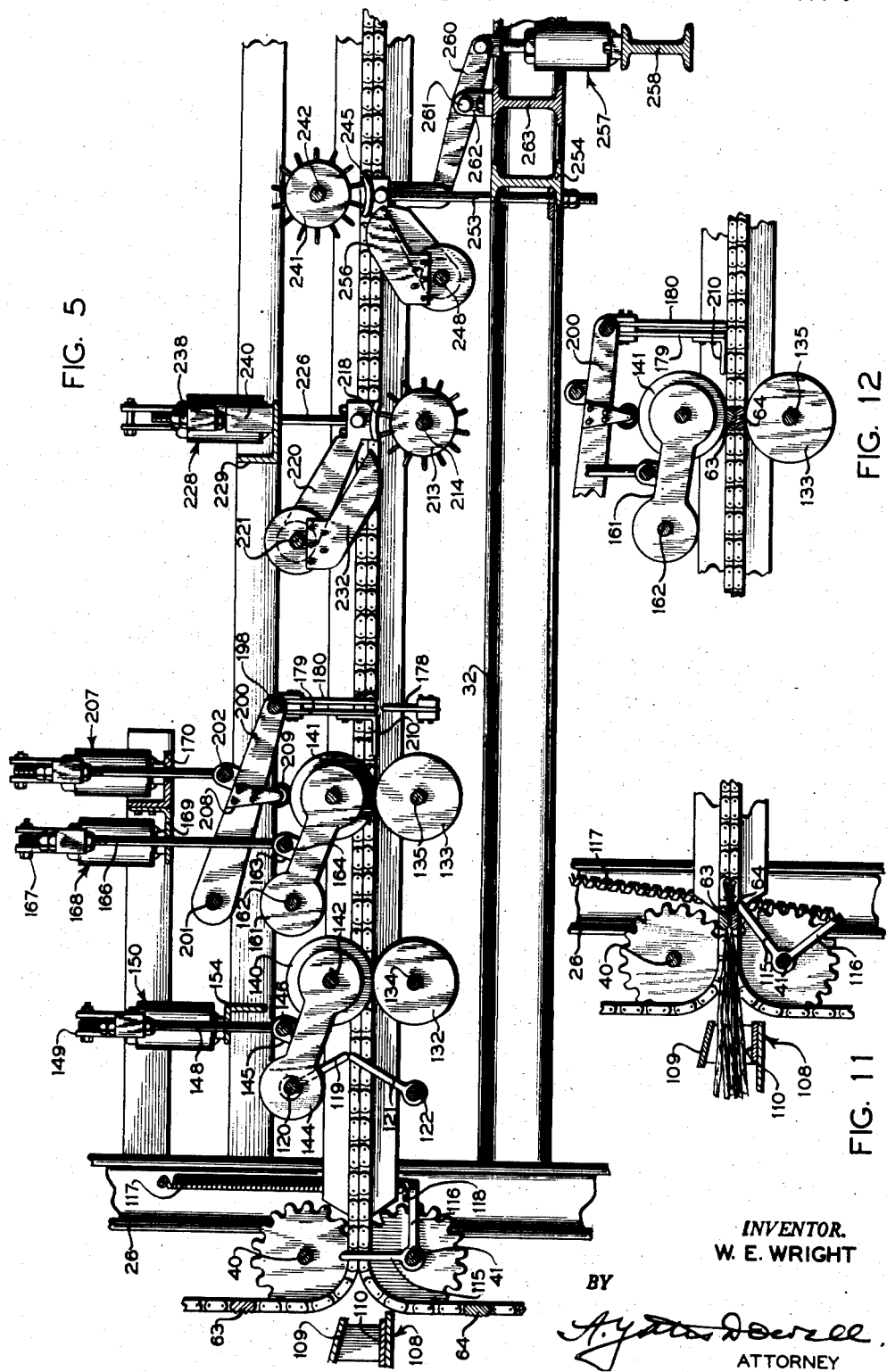
Figure 6:
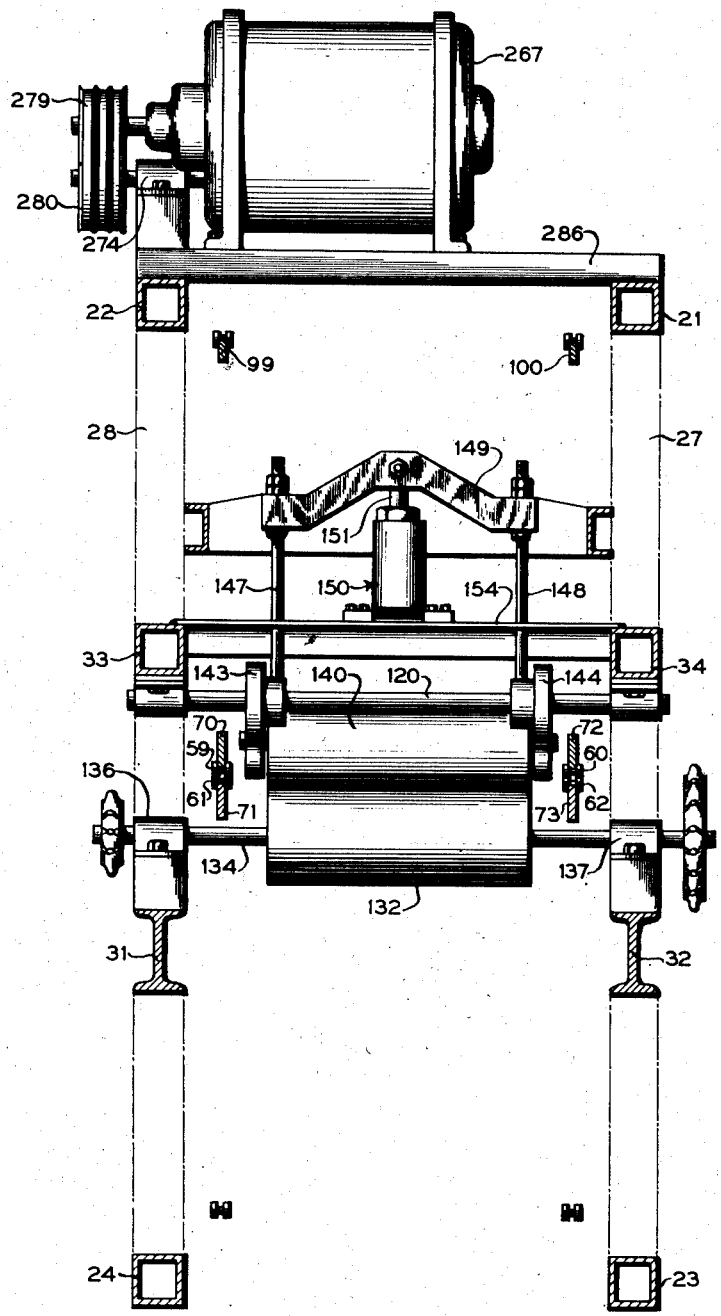
Figure 7:
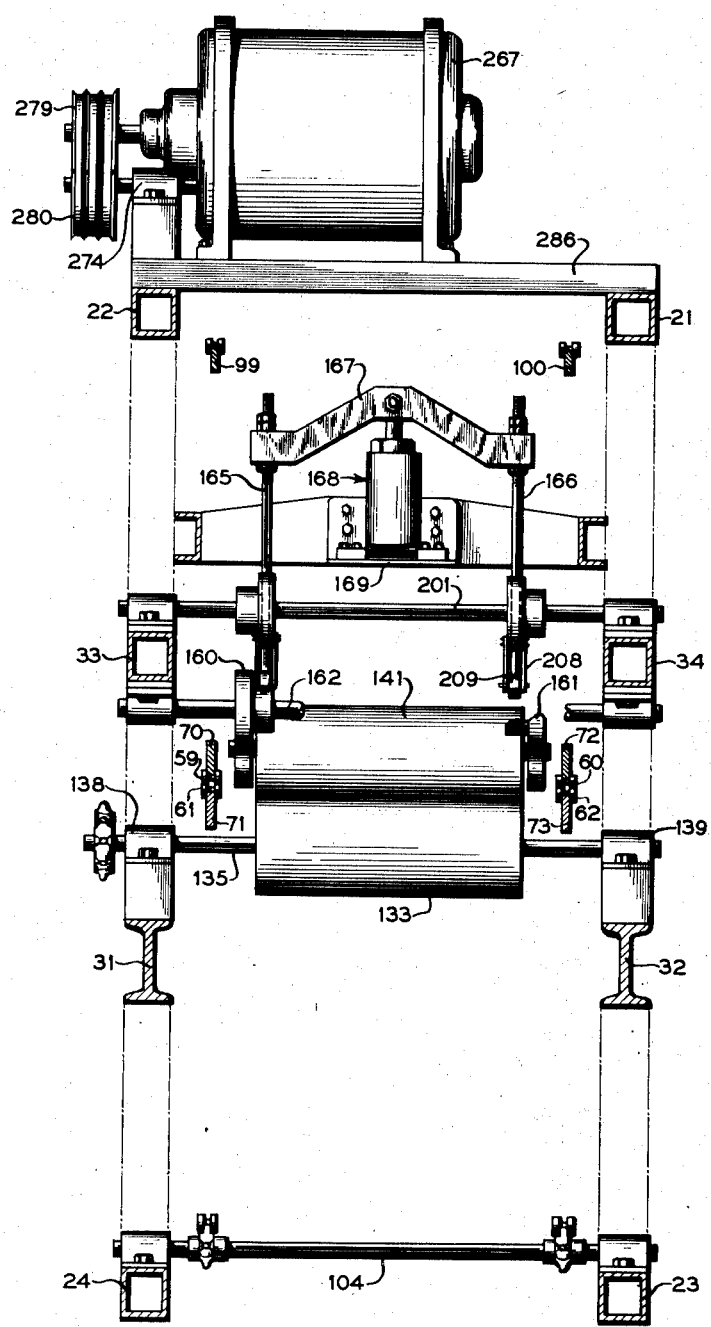
Figure 8:
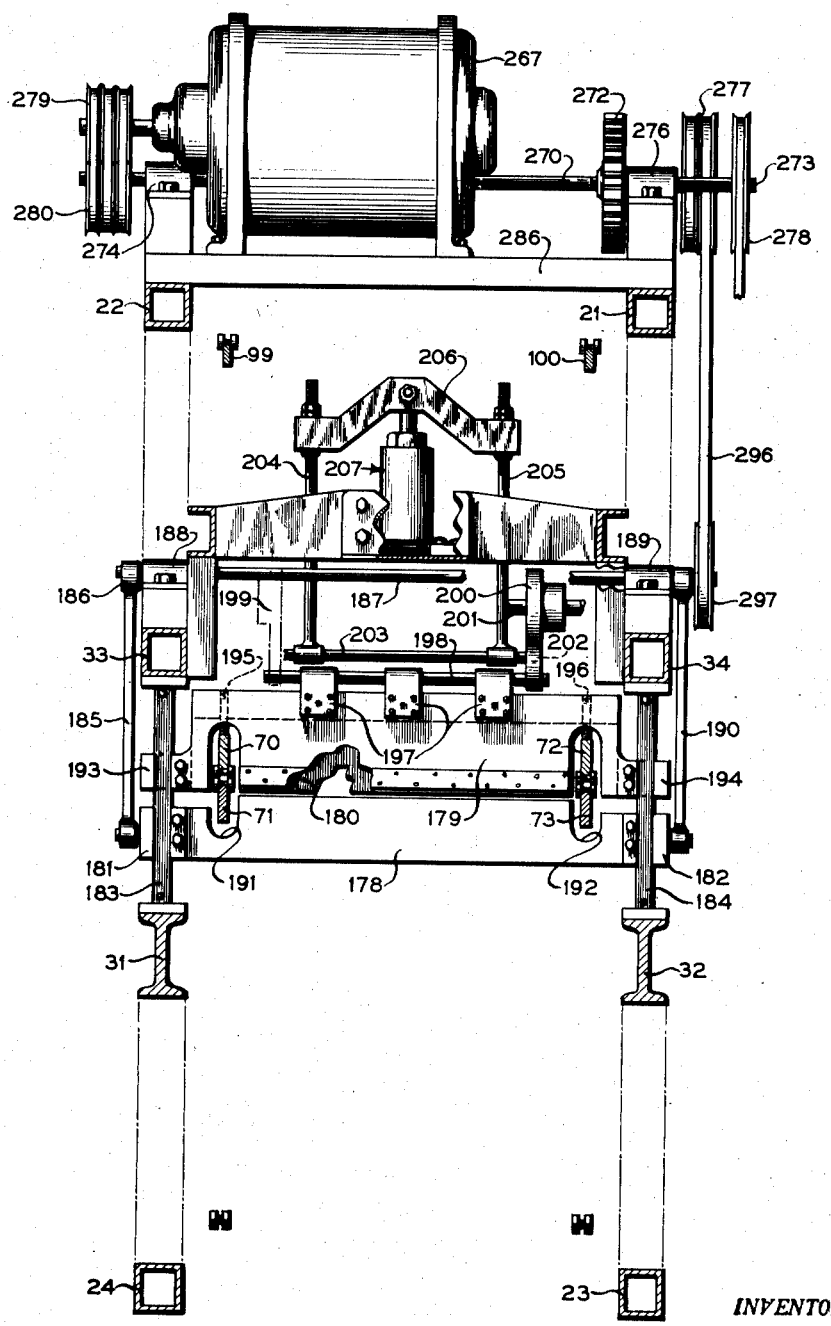
Figure 9:
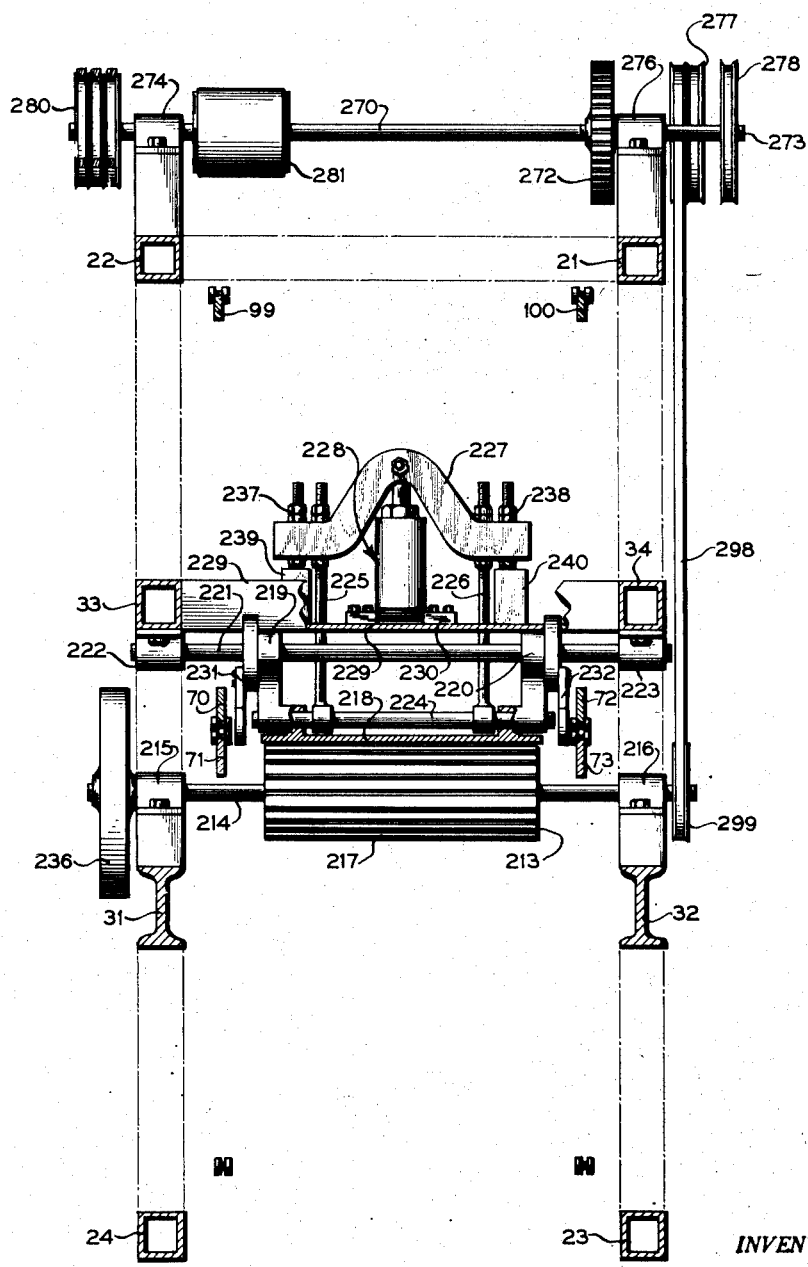
Figure 10:
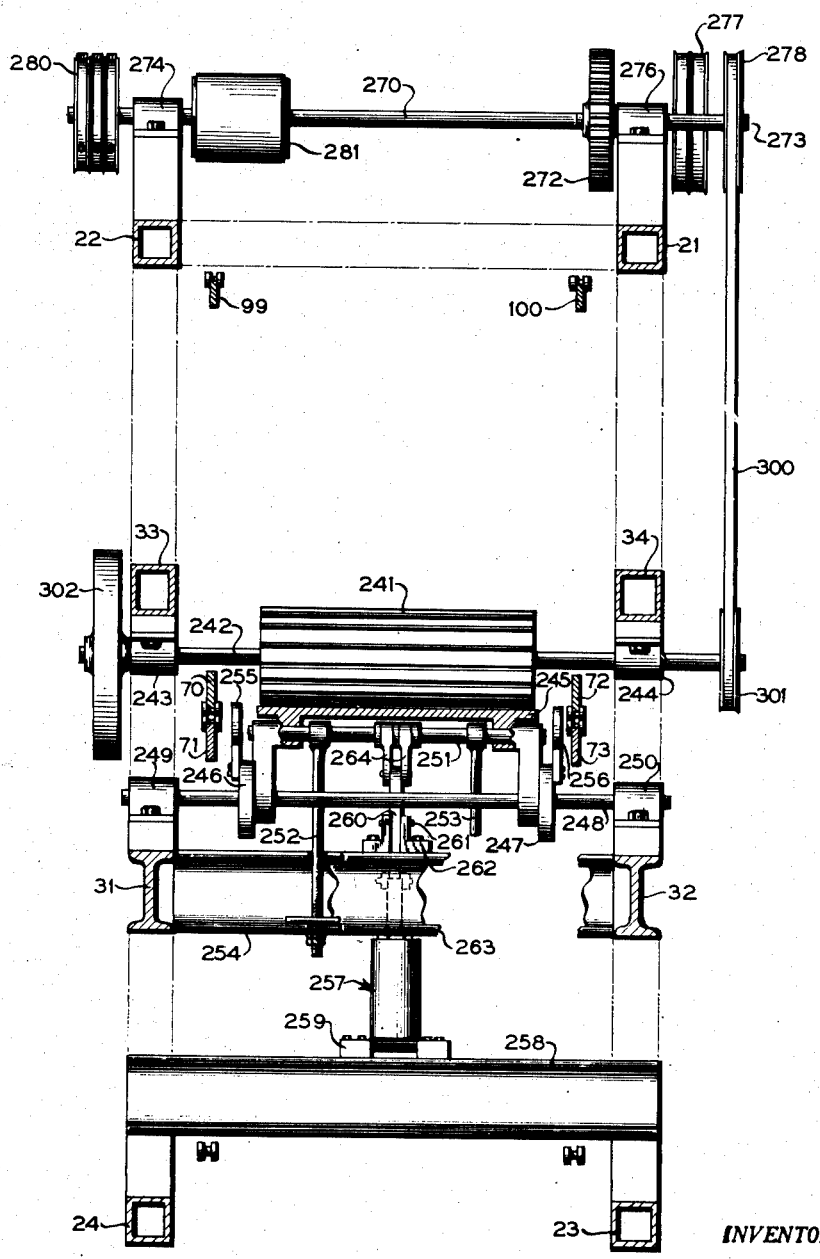
Figure 13:
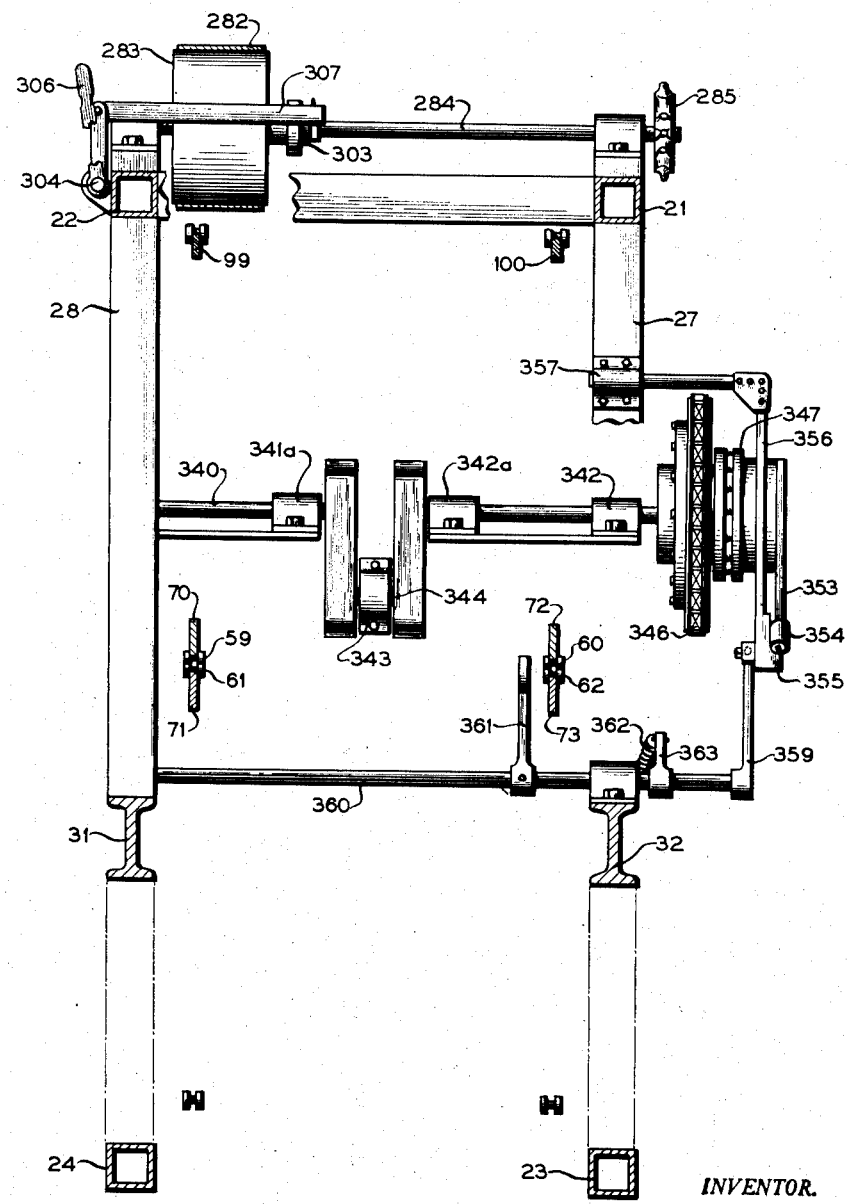
Figure 23:
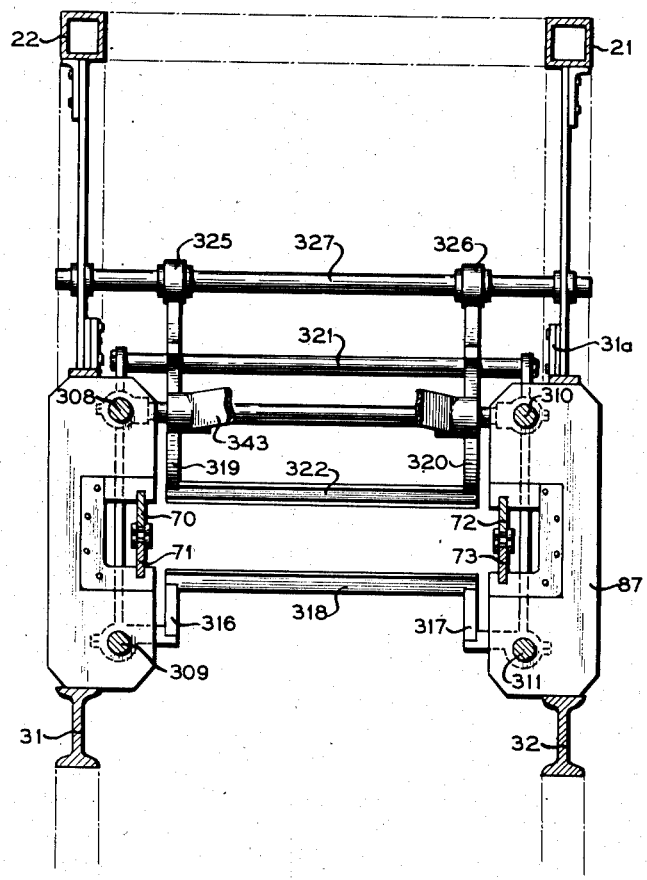
Figure 24:
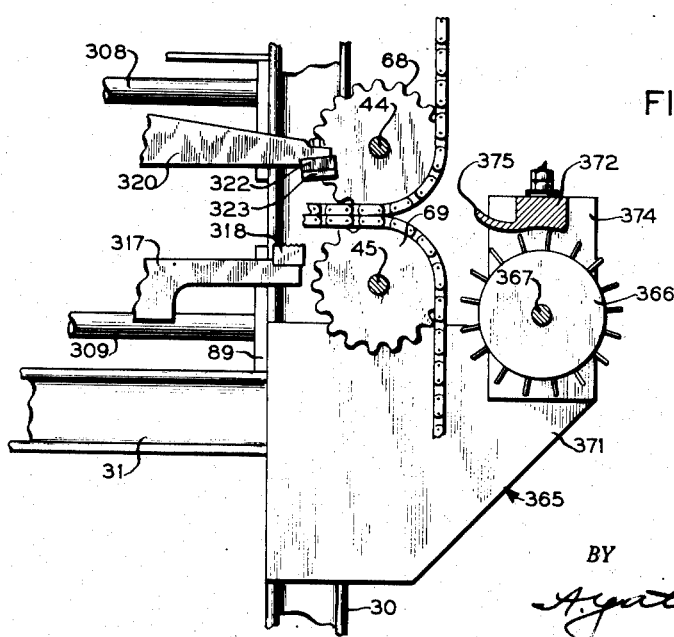
Figure 25:
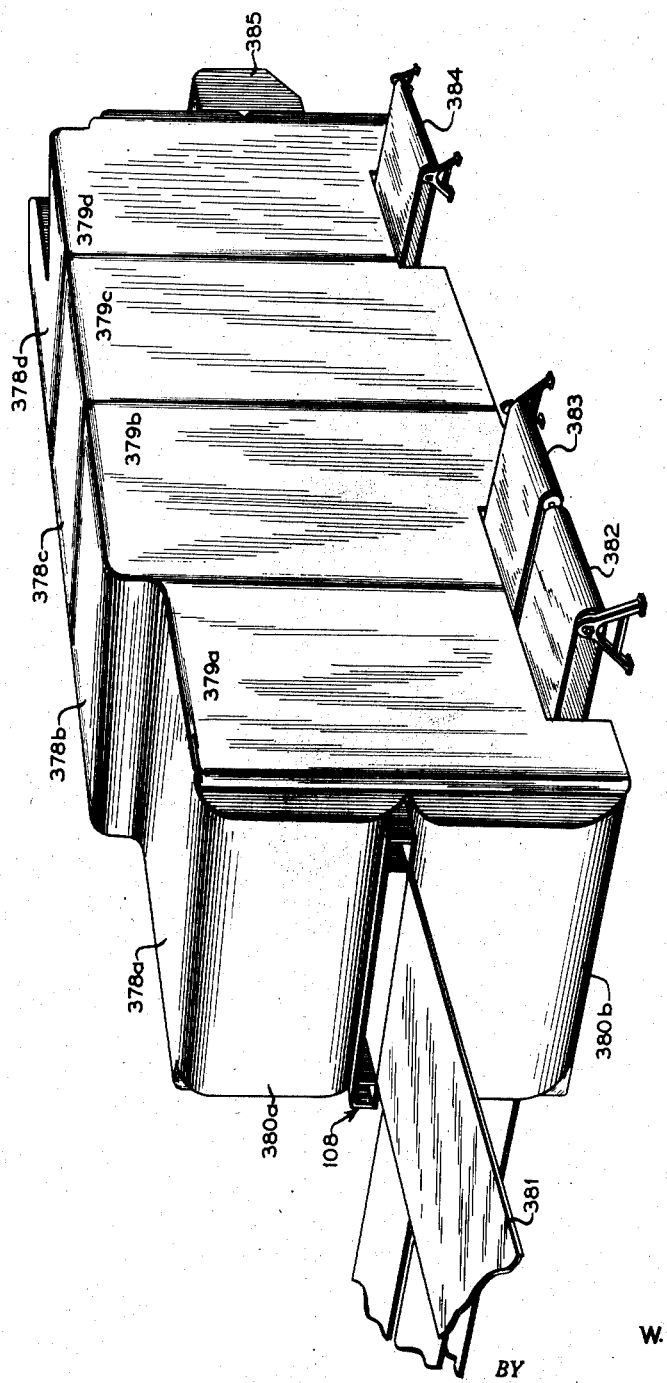
Figure 26:
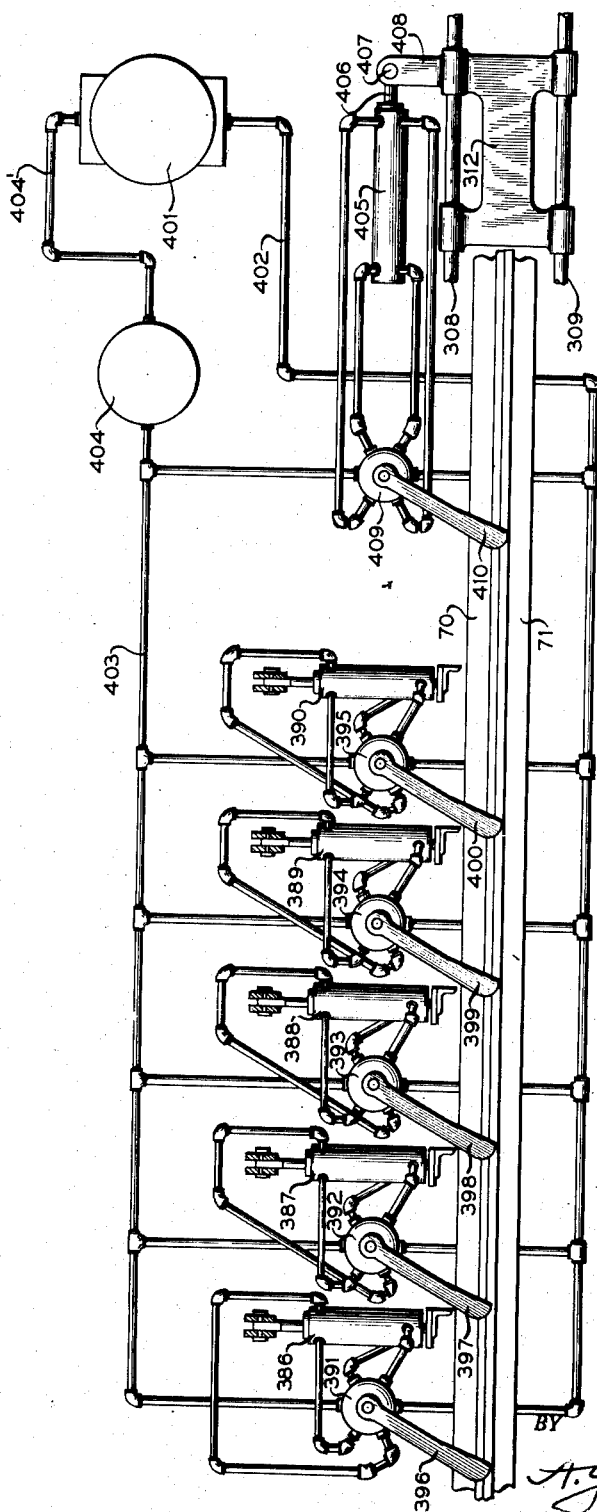

In the drawings:

Fig. 1 is a side elevational view of decorticating apparatus illustrative of the invention;

Fig. 2, a top plan view of the device illustrated in Fig. 1;

Fig. 3, a front elevational view of the device illustrated in Fig. 1;

Fig. 4, a rear elevational view of the device illustrated in Fig. 1;

Fig. 5, a diagrammatic sectional view on an enlarged scale taken on the line 5—5 of Fig. 2;

Fig. 6, a diagrammatic transverse sectional view on an enlarged scale taken on the line 6—6 of Fig. 1;

Fig. 7, a diagrammatic transverse sectional view taken on the line 7—7 of Fig. 1;

Fig. 8, a diagrammatic transverse sectional view on an enlarged scale taken on the line 8—8 of Fig. 1;

Fig. 9, a diagrammatic transverse sectional view on an enlarged scale taken on the line 9—9 of Fig. 1;

Fig. 10, a diagrammatic transverse sectional view on an enlarged scale taken on the line 10—10 of Fig. 1;

Fig. 11, a diagrammatic view of a fragmentary portion of the front end of the machine showing the manner in which ramie stalks are fed into the machine and clamped for passage through the machine;

Fig. 12, a diagrammatic view of a fragmentary portion of the machine showing the manner in which the stalk clamping means passes through one of the cleaning units of the machine;

Fig. 13, a diagrammatic transverse sectional view on an enlarged scale taken on the line 13—13 of Fig. 1;

Fig. 14, an elevational view partly in section of a clamp bracket supporting chain guides in adjusted position;

Fig. 15, an elevational view of fragmentary portions of carrier chains and guides therefor showing a supporting guide clamp in operative position;

Fig. 16, an elevational view of an outer bracket used to support chain guide clamps and crosshead slideways;

Fig. 17, a plan view on an enlarged scale of a fragmentary portion of a guide chain and a cross member, a portion being broken away and shown in section to illustrate the manner of attaching the cross members to the chain;

Fig. 18, a transverse sectional view of a pair of chain carried cross members in stalk clamping position;

Fig. 19 a longitudinal sectional view on an enlarged scale of a hydraulic check device;

Fig. 20, an elevational view of the upper end portion of the piston of the hydraulic check device shown in Fig. 19;

Fig. 21, a diagrammatic elevational view of a rear fragmentary portion of the machine showing reclamping means for cleaning the butt end portions of vegetable stalks fed to the machine;

Fig. 22, a top plan view of the reclamping mechanism shown in Fig. 21;

Fig. 23, a transverse sectional view on the line 23—23 of Fig. 22;

Fig. 24, an elevational view on an enlarged scale of stalk end cleaning mechanism at the rear end of the machine;

Fig. 25, a perspective view of the complete decorticating apparatus with covers in place thereon;

Fig. 26, a diagrammatic view of a modified arrangement using hydraulic apparatus to move parts of the cleaning devices for passage of the chain cross members and hydraulic apparatus for operating the end cleaning reclamping mechanism.

Frame

With continued reference to the drawings and particularly to Figs. 1, 2, 3, and 5 the machine or apparatus has an elongated, substantially rectangular frame, generally indicated by the numeral 20. This frame comprises a pair of upper longitudinal members 21 and 22, and a pair of similar bottom longitudinal members 23 and 24 shown in section in Fig. 6, the two members 21 and 23 at one side of the frame being shown in elevation in Fig. 1, and the two top members 21 and 22 being shown in plan view in Fig. 2. These are preferably tubular members of square or generally rectangular cross section in order to provide the maximum rigidity with minimum weight and at the same time provide convenient surfaces for the attachment of the various machine parts thereto. The upper and lower longitudinal frame members are connected by six vertical posts or columns 25, 26, 27, 28, 29 and 30, the posts 29 and 30 being illustrated in Fig. 4. The corner posts or columns 25, 26, 29 and 30 extend continuously between the corresponding upper and lower longitudinal frame members and may be formed of suitable structural iron stock, such as I-beams or channel irons or may, if desired, be tubular members similar to the longitudinal frame members.

Two longitudinal members 31 and 32 extend lengthwise of the frame one at each side thereof, parallel to the corresponding bottom longitudinal members 23 and 24 and at about one-third of the height of the frame above the bottom members. The member 31 is secured at its ends to the corner columns 25 and 29 and the member 32 is secured at its ends to the corner columns 26 and 30. These intermediate longitudinal members pass through the intermediate posts or columns 27 and 28, as is clearly illustrated in Fig. 6, so that each of these intermediate columns comprises an upper part bearing at its upper end against the under side of the corresponding upper longitudinal members 21 and 22 and at its lower end bearing on the upper surfaces of the corresponding intermediate longitudinal member 31 or 32, and lower portions extending between the intermediate longitudinal members 31 and 32 and the corresponding bottom longitudinal members 23 and 24.

Above the intermediate longitudinal members 31 and 32 there is a pair of secondary intermediate longitudinal members 33 and 34 located at approximately two-thirds of the height of the frame above the corresponding bottom longitudinal members 23 and 24. The member 34 is secured at one end to the corner column 25 and at its opposite end to the intermediate column 27 and the member 33 is secured at one end to the corner column 26 and at its opposite end to the intermediate column 28. These secondary intermediate longitudinal members are preferably formed from tubular stock of generally square or rectangular cross section.

The frame, as thus far described, comprises two side members, each comprising a bottom and top longitudinal member, a front and rear column or post, an intermediate column or post, an intermediate longitudinal member extending between the end posts and a secondary intermediate longitudinal member extending between the front post and the intermediate post. These two sides are rigidly secured together by a plurality of transverse members including an upper transverse frame member 35 and a corresponding lower transverse member 36 at the front end of the frame connected between the columns 25 and 26, an upper transverse member 37 and a lower transverse member 38 at the rear end of the frame connected to the rear posts or columns 29 and 30. Additional transverse members are interconnected between the two sides of the frame as will appear as the description proceeds. The frame members are all welded together to provide a strong and rigid structure upon which the various operative parts of the mechanism are supported.

Chain carriers

As shown in Fig. 3, four transverse shafts 39, 40, 41 and 42 are mounted upon the front end of the frame and as shown in Fig. 4, four similar shafts 43 and 46 and in Figs. 21 and 24 shafts 44 and 45 are mounted upon the rear end of the frame. Shaft 39 is mounted in ball bearings 47 and 48 secured to the front faces of the front columns 25 and 26. Shaft 40 is mounted in similar bearings 49 and 50, shaft 41 in bearings 51 and 52, and shaft 42 in bearings 53 and 54. Shaft 43 at the rear end of the machine is mounted in ball bearings 55 and 56 secured to the rear faces of the rear columns 29 and 30 and the shafts 44, 45, and 46 are all journalled in corresponding ball bearings secured to the rear faces of the rear frame posts. Each shaft has fixed thereon two chain sprockets, as indicated at 57 and 58, for the shaft 39, the sprockets on all of the shafts being of the same size and construction. This gives a total of sixteen chain sprockets carried by the eight shafts. All of the sprockets are located on the shafts adjacent the corresponding shaft bearings at opposite sides of the frame near the inner surface of the frame sides. The two front shafts 40 and 41 at the front end of the frame are located near the mid height of the frame and are spaced apart an amount such that the teeth of corresponding shaft carried sprockets clear each other by a small amount. Similarly, the shafts 44 and 45 at the rear end of the frame are disposed adjacent the mid height of the frame and spaced to provide only operative clearance between the shaft carried chain sprockets.

Four endless link roller chains 59, 60, 61 and 62 are mounted on the shaft carried chain sprockets and provide a pair of upper chains and a pair of lower chains, an upper and lower chain at the same side of the frame being substantially in vertical alignment. Each chain of the upper pair has a horizontal chain flight adjacent the top of the frame and a lower chain flight extending lengthwise of the frame adjacent the mid height position of the frame while each chain of the lower pair has an upper chain flight extending longitudinally of the frame adjacent the mid height position of the frame and a lower flight extending along the frame near the bottom thereof. Each chain is formed of a plurality of flat apertured link members connected together by pins and there is a roller or tubular spacer on each pin between the link members at the opposite sides of the chain and the number of links in each chain is preferably an even multiple of the numbers 4 and 5, 320 links for each chain having been found convenient for the purpose of the present invention.

A plurality of cross members, as indicated at 63 for the upper chains and at 64 for the lower chains, are interconnected between the two chains of each pair. The cross members connected to each pair of chains are consecutively spaced apart a distance somewhat greater than the average length of the ramie stalks fed to the apparatus. As the length of these stalks may vary between four or five feet and six or seven feet, it is desirable to provide for varying the spacing of these cross members for different crops or cuttings of ramie. As it is highly desirable to maintain uniform spacing of the cross members, the chains have a number of links, which number is evenly divisible by the numbers 4 and 5 so that 4 or 5 cross members may be used between each pair of chains with a consequent variation in the number of links between adjacent cross members to accommodate the spacing of the cross members to the average stock length of a particular cutting of ramie.

As is clearly shown in Figs. 17 and 18, the cross members are provided on the surface designed to contact the ramie stalks with longitudinal corrugations 65, so arranged that the corrugations on the two cross members which provide a pair of clamping members for the stalks contact each other leaving between them troughs or openings into which the stalk pulp is forced, permitting the cross members to obtain a firm grip on the ramie fiber. The cross members are conveniently secured to the chains by reversing two of the chain pins 66 at each end of the cross member, inserting the pin ends into wells provided in the ends of the cross member and then inserting a fastening device, such as a pin or wire 67, through aligned holes in the end portions of the cross member and the ends of the pins inserted in the cross member wells.

Two of the chain carrying shafts associated one with each pair of chains are drivingly connected by spur gears in order to maintain the two pairs of chains in synchronism. For example, the shafts 44 and 45 are interconnected by the spur gears 68 and 69 and the cross members are so arranged along the two chains of each pair that as they enter the adjacent chain flights comprising the lower flights of the upper chains and the upper flights of the lower chains along the mid height position of the frame a cross member carried by the upper chains is superimposed upon a cross member carried by the lower chains and the two cross members are carried in this superimposed relationship throughout the entire length of the frame separating only as they pass around the chain sprockets on the shafts 44 and 45 to enter the vertical chain flights at the rear end of the frame.

The intermediate flights of the two pair of chains are supported and guided by guide members 70, 71, 72 and 73 illustrated in section in Fig. 6. These guide members may conveniently be formed from metal strips of rectangular cross section having a thickness fitting conveniently between the chain side links and a width or depth sufficient to give rigidity to the guide members throughout their length. The chain contacting surfaces of these guide members are smooth and preferably hardened and the chain rollers surrounding the chain pins roll on the contacting surfaces of these guide members with a minimum of friction between the chains and the guide members. The guide members 71 and 73 for the lower chains may conveniently be fixedly secured to the frame by suitable bracket members. As shown in Fig. 1, the member 73 is supported by the bracket clamps 74, 75, 76, 77, and 78. The lower member 71 on the opposite side of the frame is supported by similar brackets or clamps. These brackets are all of the same general construction and one of them is illustrated in detail in Fig. 14, the bracket 75 having been selected for this illustration.

This bracket comprises a C-shaped member having a vertical portion 79 with an outwardly projecting leg at each end thereof, the upper leg being indicated at 80 and the lower one at 81. The legs 80 and 81 are located at the upper and lower sides of a rectangular opening within which the chain flights and chain guides are supported. The lower edge of the guide 73 is received in a notch 82 provided in the lower leg 81 adjacent the outer end thereof and is secured against movement relative to the bracket by suitable means, such as the set screw 83. The upper guide 72 has its upper edged portion received in a notch 84 in the upper leg 80 and is resiliently urged downwardly toward the guide members 73 by a C-shaped spring member 85, the ends of which bear upon the upper edge of the guide member, one at each side of the bracket leg 80 and which is adjusted by a bolt 86 which extends through an aperture in the center part of the spring and into a screw threaded aperture in the arm 80 so that tightening of the bolt will move the upper portion of the spring downwardly and increase the pressure of the spring on the guide member 72.

The brackets 74 and 75 are welded to the rearward faces of the vertical columns 25 and 27 and the brackets 76, 77, and 78 are secured in outer bracket members 87, 88 and 89 respectively, one of which, for example, the outer bracket 87, is illustrated in detail in Fig. 16. This outer bracket member 87 has a vertical portion 90 with extensions at the opposite ends thereof, the upper extension being indicated at 91 and the lower extension at 92, the upper and lower extensions and the vertical portion defining between them a rectangular opening of a size to receive the corresponding inner bracket or guide clamp 76. The outer bracket member 87 is also provided in the end portion thereof with apertures 93 and 94 for a purpose which will presently appear. The outer bracket members 87, 88, and 89 rest at their lower ends upon the outer surface of the intermediate longitudinal member 31 and are secured thereto by welding or equivalent means and are secured at their upper ends to a frame connected member 31a. In addition to the brackets 74, 75, 76, 77 and 78 which support both the lower and upper guides 73 and 72, additional brackets 95, 96, 97, and 98 are provided at properly spaced locations to control the downwardly directed spring pressure on the upper guide 72. These brackets are all similar to the bracket 75 illustrated in Fig. 14 and are supported on the lower guide member 73 so that the spring pressure functions to urge the upper and lower guide members toward each other. The spring pressure urging the upper and lower guide members together maintains a pressure on the pairs of chain cross members passing along the guided chain flights which functions to firmly clamp the ramie stalks between the cross members so that the stalks will be carried through the frame in a continuously clamped condition. The chain guide members 70 and 71 at the opposite side of the frame are supported by similar brackets similarly spaced.

The upper flights of the two upper chains 59 and 60 are supported by respective guide members 99 and 100. These upper guide members merely carry the weight of the chain flights and may be much lighter in construction than the guide members for the adjacent chain flights. The member 100 is supported on the frame by suitable seats or brackets 101, 102, and 103 secured respectively to the vertical columns 25, 27 and 29 as shown in Fig. 1. The guide member 99 is supported by similar seats or brackets secured to the vertical columns at the opposite sides of the frame.

The lower flights of the lower chains are supported on idlers 104 and 105 comprising shafts extending transversely of the frame, having chain sprockets mounted thereon and journalled in bearings mounted on the bottom longitudinal frame members. The lower chain flights are enclosed by suitable covers or shields 106 and 107 extending over the entire bottom area of the frame to prevent any ramie material from falling upon the lower chain flights or the supporting idlers. The four carrier chains are driven in a manner to move the adjacent flights intermediate the height of the frame from the front and toward the rear end of the frame at a predetermined speed by means which will be later described in the description of the driving means for the apparatus.

Feed control means

A rectangular member 108 is secured to the front faces of the front columns 25 and 26 and comprises an upper substantially horizontal bar 109 and a lower bar 110 spaced from and substantially parallel to the upper bar, and members 111 and 112 connecting the bars at their ends and intermediate vertical members 113 and 114 defining the ends of the feed slot between the bars 109 and 110, the length of the feed slot being somewhat less than the distance between the two chains of each upper and lower pair of carrier chains.

Referring now to Fig. 5, a plate 115 is positioned to the rear of the feed slot member 108 and normally occupies a substantially vertical position overlying the feed slot. This plate is pivotally mounted at its lower edge on the chain shaft 41 and has connected thereto a pair of rearwardly extending arms, one of which is indicated at 116 in Fig. 11, the outer ends of which are connected to the lower ends of respective springs, as indicated at 117 for the arm 116, the upper ends of the springs being secured to the frame above the ends of the corresponding arms. Stop members, as indicated at 118 for the arm 116, are provided to limit the spring actuated pivotal movement of the plate 115 so that the springs will normally move the plate to a substantially vertically position. The plate extends upwardly across the space between the adjacent flights of the upper and lower carrier chains so that it will be contacted by the clamping cross members as they enter the adjacent chain flights.

In feeding the machine, ramie stalks are inserted butt ends first into the feed slot and the butt ends are moved into contact with the front face of the plate 115 when in its substantially vertical position. The size of the feed slot limits the amount of ramie that can be fed to the machine at any one time to the amount which the machine can efficiently clean, and the feed control plate locates the butt ends of the stalks in an even condition so that all of them will be clamped by a pair of chain cross members. When a bunch of ramie stalks have been inserted through the feed slot, with their butt ends against the plate 115, and a lower chain cross member moves up the front vertical lower chain flights and a corresponding upper chain cross member moves downwardly along the vertical front upper chain flights, as the two cross members move around the sprockets on the shafts 40 and 41 and enter the space between the guides for the intermediate chain flights they will first clamp the butt end portions of the ramie stalks extending through the feed slot and will then tilt the plate 115 about its pivotal mounting on the shaft 41 rearwardly and downwardly until the cross members with the clamped ramie stalks can pass by this plate, as is particularly shown in Fig. 11. The cross members will then carry the stalks in a continuously clamped condition through the frame, subjecting them to successive fiber cleaning devices and after the tip ends of the stalks have passed the plate 115, the return springs will return the plate to its substantially vertical position so that a succeeding bunch of ramie stalks may be positioned for clamping by the next pair of cross members moving along with the carrier chains.

Fiber cleaning devices

The first cleaning device through which the ramie stalks pass is a leaf stripping mechanism. This mechanism includes a relatively fixed upper plate 119 extending transversely of the frame and secured at its upper edge to a transverse shaft 120 and a tiltable lower plate 121 secured at its lower edge to a transverse shaft 122. The upper plate is inclined downwardly and rearwardly relative to the direction of travel of the adjacent guided chain flights and the lower plate is inclined upwardly and rearwardly and, when in its uppermost position, contacts at its upper edge the bottom edge of plate 119 at a location near the top of the adjacent chain flights. The plate 119 is relatively fixed in position and the tiltable plate 121 is fixed to the shaft 122 which projects at one end to the outside of the frame and carries a bell crank lever 123 secured thereto against relative rotation. A link 124 is pivotally connected at its lower end to one arm of the bell crank 123 and at its upper end to an arm 125 extending from a hydraulic check device 126. A spring 127 connected at its upper end to the upper end of link 124 and at its lower end to a bracket 128 fixed to the frame urges the link 124 downwardly to rotate shaft 122 in a direction to move plate 121 toward its uppermost position. The upper limiting position of the plate is determined by an adjustable limit stop 129 operatively disposed between the bracket 128 and the lower end of link 124. When a pair of chain cross members pass through the leaf stripping mechanism, plate 121 is tilted rearwardly and downwardly out of the way of the cross members against the force of spring 127 which moves the plate upwardly compressing the ramie stalks between its upper edge ond the lower edge of the plate 119. As the stalks are drawn through the narrow opening between the adjacent edges of the two plates, the leaves and immature top portions are stripped from the stalks and most of them fall to the bottom of the frame from which they may be removed by suitable conveyor means indicated in Fig. 25. Some of the leaves, however, are frequently caught between the two plates as the plates close together and are held by the plates after the stalks have passed therethrough. In order to release these leaves from the stripper mechanism a link 130 is pivotally connected to the outer end of the other arm of bell crank 123 and is connected at its opposite end to an arm 131 mounted on a transverse shaft which carries the movable element of the last cleaning mechanism in the forward portion of the frame. When the chain cross members pass through the last cleaning mechanism in the forward portion of the frame, the arm 131 is moved to exert a push on the link 130 which moves the bell crank lever 123 to rotate shaft 122 in a direction to tilt the plate 121 rearwardly and downwardly against the force of spring 127 to thereby release any retained leaves from the stripper mechanism.

The hydraulic check device 126 slightly retards movements of plate 121 toward plate 119 and prevents the two plates from striking together with damaging force and from injuring the ramie fiber.

The next cleaning device comprises two pair of crushing rollers arranged in tandem along the adjacent chain flights. The lower or bottom rollers 132 and 133 are mounted on respective shafts 134 and 135 journalled at their ends in bearings mounted on the intermediate longitudinal frame members 31 and 32, the bearings for the shaft 134 being indicated at 136 and 137 in Fig. 6, and the bearings for shaft 135 being indicated at 138 and 139 in Fig. 7. Immediately above the first lower roller 132 there is an upper roller 140 and a corresponding upper roller 141 is positioned above rear lower roller 133. Roller 140 is fixed on a shaft 142 journalled in suitable bearings carried in the outer end portions of a pair of arms 143 and 144, the opposite ends of which are mounted on the transverse shaft 120. Each arm is provided intermediate its length with an upwardly extending apertured lug, as indicated at 145 for the arm 144, and a transverse bar 146 is secured at its ends to these lugs and has attached to it the lower ends of a pair of link rods 147 and 148. The upper externally screw threaded ends of link rods 147 and 148 pass through the ends of a yoke 149 and are adjustably secured to the yoke ends by suitable nuts threaded onto the link rods above and below the yoke. Intermediate its length the yoke is operatively connected to a hydraulic check mechanism, generally indicated at 150 and illustrated in detail in Figs. 19 and 20.

The mechanism 150 may conveniently comprise a piston 151 having at its upper end an apertured lug portion 152 pinned to the yoke, a cylinder 153 receiving the piston and mounted at its bottom and on a transverse frame member 154, and a jacket 155 surrounding the cylinder in spaced relationship to provide an annular fluid reservoir between the cylinder and the jacket. The base or bottom end of the cylinder is provided with an apertured lug 156 through which a pin 157 extends into wells provided in the ends of seat members 158 and 159 bolted to the upper surface of the transverse member 154, the axis of the pin 157 being substantially parallel to the axis of shaft 120. The link rods 147 and 148 pass through enlarged apertures in member 154, the area being such that the check device 150 may have a rocking or tilting movement about the axis of pin 157 to compensate for angular movements of bar 146 about the axis of shaft 120.

The upper roller 141 is supported at the ends of a pair of arms 160 and 161 supported at their opposite ends on a transverse shaft 162 and these arms carry upstanding apertured lugs, as indicated at 163, supporting a transverse bar 164 to which are connected the lower ends of a pair of link rods 165 and 166, the upper ends of which are adjustably connected to the ends of a yoke 167. A hydraulic check unit, generally indicated at 168 and similar in all respects to the unit 150, is interconnected between the yoke 167 and a bracket 169 secured to the forward side of a frame cross member 170.

The arrangement of the mounting for the upper crusher roller is such that when a pair of chain cross members reaches the forward pair of crusher rollers, the upper roller will ride up over the cross member raising the yoke 149 and when the cross members reach the rearward crusher rollers the rear upper crusher roller 141 will ride up over the cross members raising the yoke 167. After passage of the cross members therethrough the top rollers will return to their position adjacent the corresponding bottom rollers by their own weight assisted, if desired, by spring means connected to the arm shafts 120 and 162, the return motion of the top rollers being controlled by the respective hydraulic check devices 150 and 168 to prevent the rollers from striking together or injuring the fiber.

Referring to Fig. 19, when the piston 151 of the check device 150 is raised by raising the yoke 149, hydraulic fluid contained in the space between the cylinder 153 and the jacket 155 will flow into the cylinder through the elongated longitudinal slot 171 in the side wall of the cylinder. As the piston descends after passage of the chain cross members beyond the top roller, the piston will descend in the cylinder and the portion of its downward movement coincident with the length of the slot 171 will be substantially free, permitting a rapid return of the roller to a position near to but out of contact with the corresponding bottom roller. At the same time, a small quantity of hydraulic fluid will be discharged from the cylinder through the restricted aperture 172 and a yet smaller quantity through the adjustable discharge aperture 173. When the bottom of the piston reaches the bottom of the slot 171 there will be a substantial retardation in the rate of descent since fluid then discharged from the lower part of the cylinder is only that which passes through the openings 172 and 173. This automatically slows down the rate of descent of the piston but permits it to continue its descent at a reduced rate until the lower end of the piston passes and closes the opening 172. Further descent of the piston is then permitted only by the discharge of fluid through the adjustable discharge opening 173 and the rate of descent of the piston beyond the closure of the opening 172 is made very slow to restrain the top crushing roller from striking the corresponding lower roller with a force which might damage the rollers or injure or sever the fiber between the two rollers. The distance that the piston travels downwardly after closing of the opening 172, however, is made very slight so that the top roller quickly descends behind the chain cross members and engages the ramie stalks very close to the clamping cross members.

The construction and operation of the check device 168 is similar to that of the device 150.

While it has been found satisfactory to raise the upper crusher rollers by direct contact of these rollers with the upper chain cross members as the chain cross members pass between the corresponding upper and lower rollers, it is contemplated that over a long period of service this method of operation may involve a considerable amount of wear on the rollers and cross members and that it may be desirable to provide additional means for automatically lifting the upper rollers. Such means may conveniently be provided by securing suitable arms on the shafts 120 and 162 and extending these arms upwardly to a location in which they will be contacted by cross members moving along the upper flights of the upper chains to either raise the top rollers alone or assist the cross members passing along the adjacent chain flights to lift the rollers.

A chain sprocket 174 is secured on the end of shaft 42 and a chain 175 connects this sprocket with a sprocket 176 secured on the end of shaft 134 so that the bottom roller 132 will be driven whenever the chain carrier is driven. A chain 177, Fig. 2, connects a sprocket on shaft 134 with a corresponding sprocket of the same size on shaft 135 so that both of the bottom crusher rollers are driven. The ratio between the sprocket 174 and the sprocket 176 is such that the crusher rollers are driven at a peripheral speed slightly greater than the lineal speed of the carrier chain. This causes a slight slack or buckle in the ramie stalks passing through the crushing rollers which has the desirable effect of peeling the bark from the core of the stalks and in also relieving any tension on the fiber to avoid injury to the fiber by subsequent cleaning devices.

Immediately to the rear of the rear pair of lower and upper crusher rollers there is a reciprocatory beater mechanism for beating or shaking the crushed core material from the bark of the ramie stalks. This mechanism may conveniently include a lower, substantially vertical, transverse plate 178 reciprocably movable relative to a pair of spaced upper transverse plates 179 and 180. As particularly shown in Fig. 8, the plate 178 is secured at its ends to cross heads 181 and 182 slidable in corresponding vertical guideways 183 and 184. The cross head 181 carries a projecting arbor pin which receives the lower end of a link 185, the upper end of which is mounted on an eccentric 186 carried on the end of a transverse shaft 187 journalled in bearings 188 and 189 mounted respectively on the frame members 33 and 34. The cross head 182 has a similar arbor pin received in the lower end of a link 190 the upper end of which is connected to a corresponding eccentric on shaft 187. When shaft 187 is rotated links 185 and 190 move the crossheads 181 and 182 and the plate 178 up and down in a reciprocatory, substantially vertical movement. Plate 178 is provided with cut-out portions 191 and 192 through which pass the lower chain guide members 71 and 73.

The spaced upper plates 179 and 180 are secured at their ends to cross heads 193 and 194 which are also slidable in the vertical guide 183 and 184 and are held by these cross heads and by suitable spacers 195 and 196 in parallel spaced condition separated by a distance slightly greater than the thickness of lower plate 178. Preferably the plate 178 has a rounded upper edge and plates 179 and 180 have rounded lower edges. The lower position of the spaced upper plates is preferably regulated by adjustable limit stops comprising screw threaded members extending through the spacers 195 and 196 and resting on the upper edges of the upper chain guides 70 and 72. At their upper edges, the upper plates carry a plurality of upwardly extending apertured loops or lugs 197 through which extends a transverse bar 198. A pair of arms 199 and 200 are connected to the bar 198 at one end and supported at the opposite end on a transverse shaft 201. Each arm is provided with an upstanding apertured lug, as indicated at 202, which receives the ends of a transverse bar 203 to which are connected the lower ends of a pair of link rods 204 and 205, the upper ends of which are adjustably connected to a yoke 206. A hydraulic check device 207 is disposed between the yoke 206 and the transverse frame member 170 and operates in the same manner as the check device 150 described above. Each of the arms 199 and 200 has intermediate its length a depending lug or bracket, as indicated at 208 for the arm 200, which carries at its lower end a roller, as indicated at 209, resting upon the upper surface of the upper rear crusher roller 141. With this arrangement, when the upper crusher roller 141 is raised by the passage of a pair of chain cross members thereunder, this roller swings the arms 199 and 200 upwardly raising the spaced upper beater plates 179 and 180 out of the way of the chain carried cross members.

In order to avoid any accidental lowering of the upper beater plates before the cross members have passed completely through the beater mechanism, a flange 210 is secured to the plate 179 and extends toward the rollers 141 and 133. If the upper plates of the beater mechanism should tend to descend before the cross members have passed through the beater mechanism the flange 210 will rest upon the top of the cross members and hold the upper portion of the beater mechanism above the cross members until they have passed completely through the beater mechanism. The position of the upper roller 141, arm 200, and plates 179 and 180 when a pair of chain carried cross members is passing between crusher rollers 141 and 133 is illustrated in Fig. 12.

When the lower plate of the beater mechanism reciprocates relative to the upper plates with the upper plates in their lowermost position, the top edge of the lower plate passes the bottom edges of the upper plates in an upward direction bending the stalk material up between the spaced upper plates. The slack in the stalks provided by the speed of the crusher rollers above the lineal speed of the carrier chains permits the material to be thus bent without any danger of severing the fiber.

The spaced upper plates of the beater mechanism are urged to their lower operative position by suitable means, such as the spring 211, secured at one end of the frame and at the opposite end to an arm 212 on the end of shaft 201.

After the stalks have been carried through the leaf stripping mechanism, the crusher rollers and the beater mechanism, substantially all of the core material including the pith and the woody shell material surrounding the pith has been removed and only the bark projects from the clamping cross members. As explained above, this bark includes an inner layer of fiber and an outer layer of membraneous material and a certain amount of liquid including gums and resins. The next step is therefore to remove the membraneous outer bark from the fiber and to also remove as much of the liquid content as possible. This is accomplished by two scraper rollers, one of which scrapes the under surface of the material extending from the cross bars and the other of which scrapes the upper surface of this material. The order in which the surfaces are cleaned is not material but in the arrangement shown the first scraper mechanism cleans the under surface of the material.

A rotary scraper 213, in the form of a roller or drum, is located to the rear of the beater mechanism and mounted transversely of the frame on a shaft 214 journalled at its end in bearings 215 and 216 secured on the upper surface of the frame members 31 and 32, as is particularly shown in Fig. 9. The scraper itself comprises a cylindrical member mounted on the shaft by suitable means such as circular end plates and carrying on its surfaces a plurality of longitudinally extending radially projecting vanes 217. While the dimensions of the scraper roller are variable within reasonable limits, a suitable roller has been found to comprise a cylindrical member having a diameter of approximately 6" carrying 14 radial vanes which extend outwardly from the surface of the cylindrical member approximately three-fourths of an inch and are provided with rounded outer edges. The vanes are angularly spaced at substantially equal distances around the circumference of the cylindrical member, fourteen such vanes having been found sufficient to provide a satisfactory scraper. A head member 218 is positioned immediately above the roller 213 and comprises a plate of substantially the same length as the roller and a width somewhat greater than the distance between two of the roller vanes. The surface of the plate adjacent the roller is cylindrically concave with a curvature centered on the axis of the roller and a radius a few thousandths of an inch longer than the radial distance from the axis of the roller to the outer edge of any one of the roller vanes. With this arrangement when the plate is in its operative position adjacent the roller vanes a clearance space of a few thousandths of an inch in thickness is provided between the vanes and the adjacent surface of the roller and extends at uniform thickness over the entire surface of the head. The head is supported at the outer ends of a pair of arms 219 and 220 supported at their opposite ends on a transverse shaft 221 mounted in bearings 222 and 223 secured to the under surface of the frame members 33 and 34. The head is rigidly secured to the outer ends of these arms so that it is held firmly in position relative to the vaned roller 213. The ends of the arms secured to the head are apertured to receive the ends of a transverse bar 224 to which are secured the lower ends of a pair of link rods 225 and 226, the upper ends of which are adjustably connected to the end portions of a yoke 227. A hydraulic check device, generally indicated at 228, has its piston secured to yoke 227 and its cylinder mounted on a transverse frame member 229 by a pivotal connection 230, the construction and operation of the check device being the same as that of the device 150 illustrated in Fig. 19 and described above. Cam members 231 and 232 are secured one to each of the arms 219 and 220, as particularly shown in Figs. 5 and 9. These cam members project downwardly below the arms to a position at which they are contacted by the chain cross members as a pair of cross members approaches the roller 213. The cross members will strike the cams and raise the head 218 upwardly to permit the cross members to pass beneath the head and over the roller. The head is returned to its position adjacent the top of the roller by suitable spring means. As illustrated in Fig. 1, a tension spring 233 is secured at one end to a crank arm 234 secured on the outer end of the shaft 221 and at its opposite end, by means of an adjustable connection, to a bracket 235 secured to the other side of the frame member 33. A similar spring is preferably located at the opposite side of the frame and operatively connected to the opposite end of the shaft 221. Downward movement of the head under the force of the springs is controlled by the hydraulic check device 228 so that the head does not strike the roller 213 but at the same time the head will move downwardly immediately behind the chain cross members as soon as the cross members have passed beyond the rearward edge of the head.

The roller 213 is operated at high speed and its rotation is made smooth and uniform by a suitably fly wheel 236 fixed on one end of the shaft 214 and positioned on the outer side of the frame.

The clearance between the head and the roller is controlled by adjustable length stops 237 and 238, each comprising an externally threaded member received in an internally threaded aperture in a block secured in the corresponding end of the yoke 227 and bearing at its lower end on an abutment 239 or 240 supported on the transverse frame member 229. The limit stops are secured in adjusted position by suitable means such as lock nuts threaded on the upper ends of the externally screw threaded members.

The cleaning means for the top surface of the material is positioned immediately to the rear of the bottom surface scraper means and comprises a vaned or fluted rotary scraper in the form of a roller 241, similar in size and construction to the roller 213, mounted on a transverse shaft 242, the ends of which are journalled in bearings 243 and 244 secured to the under surface of the corresponding frame memberse 33 and 34, a particularly illustrated in Fig. 10. In this case the head 245 is positioned below the roller 241 and is of substantially the same size and shape as the head 218 as described above. The head is carried on a pair of arms 246 and 247 mounted on a transverse shaft 248 journalled at its end in bearings 249 and 250 secured on the upper surface of corresponding frame members 31 and 32. The head is rigidly secured to the outer ends of arms 246 and 247 so that it is held rigidly in operative position.

The portions of the arms attached to the head are apertured to receive the ends of a transverse bar 251 to which are secured the upper ends of a pair of link rods 252 and 253 which extend downwardly and pass through apertures in a transverse frame member 254 and are provided with externally screw threaded lower end portions upon which are threaded suitable nuts which engage the under surface of the cross members 254 to provide limit stops for the upward movement of the head 245. By properly adjusting the nuts on the lower ends of the members 252 and 253 the proper clearance between the head and the roller can be obtained. Cams 255 and 256 are secured respectively to the arms 246 and 247 and extend upwardly to a position in which they are contacted by chain cross members approaching the roller 241. As the cross members pass these cams the head 245 will be forced downwardly to permit the cross members to pass by the head and under the roller 241. A hydraulic check device, generally indicated at 257, is secured at its lower end to the upper surface of a transverse member 258 by a pivotal connection 259 and has its piston connected to one end of a lever 260 fulcrumed intermediate its length on a pin 261 mounted in an apertured bracket 262 secured on the upper surface a transverse frame member 263. Lever 260 is pivotally connected at its opposite end, by means of links 264, with the bar 251.

The head 245 is moved upwardly to its operative position by suitable means, such as the tension spring 265, Fig. 1, pivotally secured at one end to the outer end of an arm 266 secured on the end of a shaft 248 to rotate the shaft 248 in a direction to raise the head 245. Preferably, a similar spring and arm is disposed at the opposite side of the frame from that illustrated in Fig. 1. The hydraulic check device 257 controls the upward movement of head 245 and prevents the head from striking the roller 241.

The cleaning apparatus so far described will completely clean the fiber of the stalk portions extending from the clamping cross members. The butt end portions of the stalks held by the cross members will, however, be carried through this part of the cleaning means without being cleaned but they will be completely crushed by the clamping action of the cross members. These butt end portions are cleaned by end cleaning mechanism to be later described in detail.

*Drive means for chain carriers and fiber cleaning devices*

A power plant, such as the electric motor 267, is mounted on the frame, preferably on the top thereof, and is supported on suitable transverse members 268. A multiple V-belt pulley 279 on the motor shaft carries belts 269 which engage a multiple pulley 280 on a transverse drive shaft 270. A spur gear 271 fixed on shaft 270 adjacent one end thereof meshes with a spur gear 272 fixed on a shaft 273 which may be only a stub shaft or may extend across the frame if desired. Shaft 270 is journalled in bearings 274 and 275 mounted on the upper surfaces of frame members 21 and 22 and shaft 273 is journalled in the bearing 276 carried on frame member 21. The gears 271 and 272 are of the same size so that shafts 270 and 273 rotate at the same speed in opposite directions.

A small pulley 281 on shaft 270 is drivingly connected by a belt 282 with a large pulley 283 on a transverse shaft 284 journalled in suitable bearings mounted on the top frame members and shaft 284 carries a chain sprocket 285 connected by a drive chain 286 with a larger sprocket 287 on a transverse shaft 288 also journalled in bearings mounted on the top of the frame and carrying a small sprocket 289 connected by a chain 290 with a large sprocket 291 on shaft 292 which is also journalled in suitable bearings carried on the top of the frame and carries a small sprocket 293 connected by a chain 294 with a sprocket 295 carried on the end of the carrier chain supporting shaft 45. The driving connection from the pulley 281 to the chain sprocket 295 constitutes a speed reducing drive for driving the carrier chains. This gear reduction is such that although the driving motor operates at a speed of around 1800 R. P. M. the chain speed is approximately 20 ft. per minute. While a chain drive speed reducing mechanism has been shown, this speed reduction may be obtained by other suitable means, such as a speed reducing gear train, without in any way exceeding the scope of the invention.

As explained above, the crusher rollers are driven by the chain 175 from a sprocket 174 on the carrier chain shaft 42 at a peripheral speed slightly greater than the lineal speed of the carrier chains.

A V-belt 296 connects one part of the double pulley 277 with a smaller pulley 297 on the end of the eccentric shaft 187 to drive the beater mechanism. A V-belt 298 connects the other part of the pulley 277 with a pulley 299 on the end of the scraper roller shaft 214 and a belt 300 connects pulley 278 with a pulley 301 on the end of scraper roller shaft 242. The two scraper rollers are thus driven in opposite directions and at high speed, a desirable speed having been found to be approximately 2400 R. P. M. The two scraper roller shafts 214 and 242 are provided with balancing fly wheels, as indicated at 236 and 302 in Figs. 9 and 10 respectively. A clutch 303 is interposed between shaft 284 and pulley 283 and is manually controllable by means of a control shaft 304 rotatably mounted on the side of the upper frame members 22 and provided at spaced points with operating handles 305 and 306 and lever means 307 operatively connecting it with the clutch 303. By means of this clutch the motor may be started without the load of the carrier chains, crushing rolls and end cleaning mechanism and this load may be drivingly connected after the motor has come up to speed. The machine may be quickly stopped by declutching the drive from the motor and the clutch may be operated from widely spaced stations, as indicated by the handles 305 and 306.

*Butt end cleaning means*

Although the above described fiber cleaning means will thoroughly clean the fiber in the portions of the ramie stalks projecting from the chain carried clamping cross members it cannot clean the butt end portions held by the clamping members during the above described cleaning operation. As it has been found that these butt end portions contain a worthwhile amount of fiber of high commercial quality suitable means have been provided for cleaning the fiber in the butt end portions of the stalks after the stalks have been released by the chain carried cross members.

As explained above, the outer bracket members 87, 88 and 89 are secured to the frame member 31 and each is provided with apertures, one adjacent each end thereof. The upper and lower apertures in the three brackets are aligned and there are three similar brackets on each opposite side of the machine. Four guideway members 308, 309, 310 and 311 pass through the apertures in these brackets and are supported by the brackets. A crosshead 312 is slidably mounted on the guide members as by having at its corners cylindrical bearing members provided with bores which receive the cylindrical guide members. The crosshead may conveniently comprise a pair of substantially rectangular end frames 313 and 314 disposed transversely of the frame and rigidly secured together by connecting side portions as indicated at 315. A pair of arms 316 and 317 are fixed to the lower part of the crosshead and extend therefrom toward the rear end of the machine. At their rearward ends these arms support a cross member 318 which constitutes the lower one of a pair of reclamping cross members. A pair of upper arms 319 and 320 are pivotally fulcrumed on the rear upper portion of the crosshead by suitable means such as the transverse shaft 321. These arms extend rearwardly from the fulcrum point and carry at their rearward ends a cross bar 322 having on its lower surface a facing 323 of rubber or a similar resilient material. The cross bar 322 constitutes the upper one of the pair of reclamping cross members.

The arms 319 and 320 extend forwardly of the fulcrum shaft 321 and are provided at their forward ends with cam surfaces, as indicated at 324 for the arm 320, which cooperate with rollers 325 and 326 mounted on a frame carried transverse shaft 327. Rearwardly of the fulcrum shaft 321 the arms are provided with upstanding apertured lugs, as indicated at 328 and 329 which receive the ends of a transverse crosshead carried shaft 330 provided with apertured enlargements 331 and 332 constituting pads for the lower ends of compression springs 333 and 334, arranged to resiliently force the rearward ends of the upper arms downwardly as the crosshead 312 with the arms carried thereby is forced rearwardly of the machine. These springs include respective guide rods 335 and 336 each secured at one end to a respective apertured lug 337 and 338 pivotally mounted on a transverse shaft 339 journalled in frame supported bearings, said guide rods being slidable through the aperture in pads 331 and 332. The compression springs and associated guide rods constitute spring toggles set at an angle such that they force the rearward ends of arms 319 and 320 downwardly when the crosshead 312 is moved rearwardly. The cam and roller arrangement of the arms 319 and 320 is such that when the crosshead is moved rearwardly the forwardly extending portions of the arms pass from beneath the corresponding rollers 325 and 326 so that the forward portions of the arms may swing upwardly about the fulcrum on shaft 321 as the rearward portions are forced downwardly by the toggle spring devices. When the crosshead is returned forwardly to its normal position the cam surfaces at the forward ends of the upper arms contact the corresponding rollers 325 and 326 and force the forward ends of the arms downwardly. With this arrangement when the crosshead moves rearwardly, the cross members 318 and 322 close together to reclamp the ramie stalk portions held by the chain carried cross members as the chain carried cross members start around the chain sprockets on the shafts 44 and 45 and separate, thereby releasing their grip on the butt end portions of the stalks. When the crosshead is returned forwardly the arm carried cross members separate releasing the ramie fiber. In their normal operative position the arm carried cross members are disposed one below and one above the guided intermediate flights of the carrier chains so that the ramie material is carried between them by the chain carried cross members.

Reciprocatory movement is imparted to the crosshead 312 by means of a crank shaft 340 disposed transversely of the frame and journalled in frame carried bearings 341, 341a, 342 and 342a and a connecting member 343 journalled at one end of the crank pin 344 and pivotally mounted at its opposite end on a shaft 345 extending transversely of the crosshead at the forward upper edge thereof. The member 343 is preferably V-shaped with the portion at its apex journalled on the crank pin 344 and the separated ends of its leg portions journalled on the shaft 345 at the opposite sides of the crosshead. The crank shaft is driven by a chain sprocket 346 and one revolution clutch 347. The sprocket 346 is driven by a chain 348 passing over a sprocket 349 on shaft 339 and a second chain 350 passing over a sprocket 351, on shaft 339 and a sprocket 352 on carrier chain shaft 43 so that the sprocket 346 is driven in synchronism with the carrier chain.

The clutch 347 is a friction type clutch and is operated by a control lever 353 which is pivotally secured to the outer clutch plate, extends diametrically across and beyond the clutch and carries at its projecting end a roller 354 cooperating with a cam 355 mounted on a swinging arm 356 depending from a pivotal mounting at its upper end on a frame supported lug 357. The lower end of the arm 356 is connected by a link 358 with an arm 359 secured on the end of a transverse shaft 360 journalled in suitable frame supported bearings. The shaft 360 carries a radially extending cam member 361, the upper end of which is in position to be contacted by chain carried cross members passing along the guided chain flights intermediate the height of the frame. The shaft is rotated in a direction to hold the cam in its uppermost position by suitable means, such as the spring 362, connected at one end to the frame and connected at its opposite end to a radial arm 363 extending outwardly from the shaft 360.

Normally the spring 362 holds the arm 359 and lever 356 in position to maintain the clutch disengaged, in which case the sprocket 346 rotates continuously but the crank shaft 340 is not driven. When a lower chain cross member strikes the cam 361 the cam is forced downwardly rotating the shaft 360 in a counter-clockwise direction, as viewed in Fig. 1, moving the lever 356 in a direction to move the cam 355 from under the roller 354. This permits the clutch to engage and the clutch and crank shaft will then be rotated by the sprocket 346. As soon as the chain cross member passes over the cam 361 the spring 362 restores the arm 359 and lever 356 to their normal positions bringing the cam 355 back into the path of the roller 354.

This occurs when the crank shaft has rotated only a relatively few degrees. The crank shaft will, however, continue a complete rotation and when the roller 354 rides up on the cam 355 at the end of a complete crank shaft rotation the clutch will again be released. Thus one complete reciprocation is imparted to the crosshead 312, each time a chain carried cross member trips the crank shaft clutch mechanism.

When the crosshead 312 has been moved rearwardly a sufficient amount to carry the end portions of the upper arms from beneath the corresponding rollers 325 and 326, the upper cross member 322 will be lowered against the lower cross member 318 clamping the clean fiber immediately behind the chain carried cross members. Continued rearward movement of the crosshead follows the movement of the chain carrier cross members as they release the butt end portions of the ramie stalks and then feeds these butt end portions into the end cleaning mechanism mounted on the rear end of the frame and generally indicated at 365.

This rear cleaning device comprises a rotary scraper in the form of fluted roller 366 having a shaft 367 journalled in bearings 368 and 369 supported on bracket extensions 370 and 371 secured to the respective vertical columns 29 and 30 at the rear end of the machine, and a cooperating head 372. The scraper is similar in construction and operation to the previously described rotary scrapers 213 and 241 but is preferably somewhat larger in diameter and has a greater number of vanes uniformly spaced therearound. The head 372 is also similar in construction to the previously described heads 218 and 245 but in this case the head is rigidly secured in position by suitable means such as the end supports 373 and 374 extending upwardly from the corresponding brackets 370 and 371 to receive the ends of the head. The head is secured to these end supports by suitable means, such as bolts or cap screws, and suitable shims or other adjusting means may be used to accurately determine the clearance between the head and the rotary scraper. A rounded lip 375 is provided at the forward side of the head 372, and may be integral therewith, to assist in guiding the butt end portions of the ramie stalks into the end cleaning device.

After the ramie fiber has been reclamped by the reciprocatory clamping members 318 and 322, further movement of the cross head 312 to the rear feeds the crushed butt end portions of the stalks into the rear cleaning mechanism and then, as the crank arm moves the crosshead forwardly, withdraws these butt end portions of the stalks from the end cleaning mechanism. As the forward movement of the crosshead is continued until the cammed front ends of the upper arms ride under the rollers 325 and 326, the cross members 318 and 322 separate to release the completely cleaned fiber ribbons. When the ribbons are released some of them will fall by their own weight from the reciprocatory clamps upon a suitable conveyor mechanism which carries the cleaned ribbons from the cleaning apparatus to a location at which they enter the drying process.

While suitable means may be provided to drive the rear cleaning scraper 366 from the primary power plant 267, it has been found desirable, in at least some cases, to drive this scraper from a separate secondary power plant, such as the electric motor 376 mounted on the top of the frame at the rear end thereof and having a shaft carried pulley connected by a belt 377 with a belt pulley on the corresponding end of shaft 367. This arrangement permits continuous high speed operation of the end cleaning rotary scraper or roller and avoids the necessity of applying a fly wheel to smooth out any variations in its rotation.

Fig. 25 illustrates in perspective the apparatus, or a section of decorticating apparatus, provided with a suitable cover, conveyors and feeding conveyor or table. The cover may comprise a top cover suitably divided into panels, as indicated at 378a, 378b, 378c and 378d. The side cover illustrated may conveniently comprise the sections or panels 379a, 379b, 379c and 379d. The opposite side of the machine would be covered by similar side panels. The front end is covered by suitable panels 380a and 380b provided adjacent their meeting edges with inwardly curved portions disposed one above and one below the feed slot mechanism 108. A feed conveyor or table 381 is positioned adjacent the feed slot to assist in carrying the ramie stalks to the feed slot of the machine.

A suitable belt conveyor 382 is disposed transversely of the machine adjacent the bottom and the front end thereof to carry the ramie leaf and top material to a suitable location from which it can be salvaged for stock feed or other profitable purpose. A second belt conveyor 383 adjacent the conveyor 382 removes the waste stalk material from the apparatus to a location from which disposal of this waste material can be conveniently made, and a third conveyor 384 positioned near the rear end of the machine removes the cleaned fiber from the machine to a location from which it is transferred to the fiber drying apparatus. The end cleaning mechanism is also preferably enclosed in a suitable cover 385.

In the alternative arrangement illustrated in Fig. 26 double acting hydraulic rams, as indicated at 386, 387, 388, 389 and 390 are operatively connected respectively to the front upper crushing roller 140, the rear upper crushing roller 141, the upper plates 179—180 of the beater mechanism, the bottom scraper head 218, and the top scraper head 245 to move these various components out of the way of the chain carried cross members as the cross members reach the corresponding stations lengthwise of the machine frame. These hydraulic devices may be conveniently connected to the machine by substituting them for the hydraulic check devices 150, 168, 207, 228 and 257 respectively. One contemplated method of installation is to support these members on respective transverse frame members and operatively connect them to the respective yokes 149, 167, 206, 227 and the lever 260 or an equivalent thereof. The invention, however, is in no way limited to this particular arrangement and other means may be devised for operatively connecting the several hydraulic devices to the corresponding movable fiber cleaning components. The various hydraulic units are controlled by respective valves 391, 392, 393, 394 and 395 preferably mounted on the machine frame above the guided chain flights. These valves may be operated by respective levers or trigger members 396, 397, 398, 399 and 400 secured at their upper ends to rotatable valve stems or shafts and extending downwardly to positions at which their lower ends will be contacted by chain carried cross members passing along the guided chain flights intermediate the height of the frame. These trigger members are moved in one direction by the chain cross members and are returned to their opposite limit of movement by suitable spring devices, not illustrated.

A hydraulic pump 401 has its outlet connected to a suitable conduit 402 and individual branch conduits with the pressure ports of the several valves and the exhaust ports of the several valves are connected through individual branch conduits and a main conduit 403 with a sump or reservoir 404 which is in turn connected by a suitable conduit 404' with the intake side of the pump 401.

In addition to its pressure and exhaust ports, each valve has four ports connected with the corresponding hydraulic lift device, one pair of ports including a pressure port and a relief port being connected with the bottom of the corresponding hydraulic lift device and another pair of ports including a relief port and a pressure port being connected with the top of the corresponding hydraulic device. When the valve operating lever is in its normal position, to which it is urged by the corresponding spring means, it connects the top of the corresponding hydraulic lift device with the pressure line from the pump 401 and connects the bottom of the lift device through the line 403 with the sump 404 permitting the corresponding yoke to repose in its lowermost position and the attached roller, beater plates, or scraper head to be positioned in operative fiber cleaning position. When the trigger member or valve actuating lever is moved by contact with a chain carried cross member the connections are reversed so that the bottom of the hydraulic lift device is connected with the pressure line and the top is connected with the drain line. The hydraulic pressure acting on the piston of the lift mechanism will then raise the corresponding movable cleaner mechanism component to permit the chain carried cross members to pass. As soon as the actuating lever is released by the cross member the connections will be reversed again and the movable components forced down to its operative position by hydraulic pressure. These lift devices also act as hydraulic checks in the manner described above in connection with Figs. 19 and 20 to retard the last part of the downward movement of the components to avoid damage to the machine or to the fiber.

The crosshead 312 may also be reciprocated by suitable hydraulic apparatus deriving its power from the hydraulic pump 401. A double acting hydraulic motor 405 has its cylinder portion mounted on the frame and its piston 406 connected to the crosshead by suitable means such as the pin 407 and bracket 408. The crosshead may be moved by a single hydraulic motor of sufficient power or may be operated by a pair of motors arranged in parallel, as may be desired. In order to simplify the drawing, only one motor has been illustrated. This motor is controlled by a suitable valve 409 having an actuating lever 410 mounted on a rotatable valve shaft and extending to a position such that its free end is contacted by the chain carried cross members as they pass a predetermined location lengthwise of the frame. The lever 410 is resiliently urged to its normal position by suitable spring means not illustrated. When in its normal position the valve functions to connect the rearward end of the cylinder of the hydraulic mechanism 405 with fluid pressure from the conduit 402 and to connect the forward end of the motor with the drain line 403. When the lever 401 is moved by a pair of passing chain cross members the connections to the motor are reversed so that the forward end is connected with the pressure conduit and the rearward end with the drain line. This functions to force the crosshead 312 rearwardly to grasp the ramie fiber carried by the cross members and feed the clamped ends into the end cleaning mechanism 365. When the actuating lever is released, the connections will be again reversed applying hydraulic pressure to return the crosshead forwardly to its normal position withdrawing the ends of cleaned fiber from the end cleaning mechanism and opening the crosshead carried clamps to release the cleaned fiber.

The hydraulic apparatus provides a quiet and efficient manner of operating the bodily movable components of the cleaning mechanism.

With the above described apparatus all of the core material is removed from the bark of the ramie stalks by the crushing and bearing device and the outer bark is then completely removed from the fiber by the rotary scrapers which also squeeze most of the liquid content from the fiber thereby eliminating a large amount (up to 80%) of the natural gums and resins which would otherwise adhere to the fiber and harden during the fiber drying operation. This eliminating of the gums and resins greatly facilitates the drying and degumming processes and the continuous clamping of the stalks adjacent their butt ends during the entire cleaning operation produces flat ribbons of straight parallel fibers greatly facilitating the separating and carding processes preliminary to spinning the fiber into thread for textile use.

The apparatus shown in the drawings and above described may constitute a complete and entire machine or, within the limits of the invention, may constitute only one unit of a machine composed of several similar units. Where several such units are combined together to form a single machine the intermediate frame sides would be common to two adjacent units, thereby eliminating one frame side and the various transverse shafts and transverse frame members could conveniently be extended through the entire width of the apparatus and could be driven from a single primary power plant if so desired. Each unit, however, would have its own carrier means and reciprocatory clamp mechanism. Common conveyors could be extended through the several units to continuously remove the material from the apparatus and feeding of the entire apparatus could be accomplished from a single distributing conveyor adjacent the front end thereof.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A ramie fiber cleaning machine comprising a rectangular frame having upper and lower longitudinal and transverse members and vertical columns at the corners thereof extending between said upper and lower members; a movable carrier supported on said frame comprising an upper pair and a lower pair of endless roller chains so disposed that the lower flights of the upper chains and the upper flights of the lower chains are adjacent and parallel at substantially the midheight of the frame, and cross members extending between the two chains of each pair and so spaced that a cross member connected to the upper chains is superimposed on a cross member carried by the lower chains as the two cross members enter the lower and upper flights of the respective upper and lower chain pairs for engaging and clamping the ramie stalks and are held in such superimposed position as they are moved from one end to the other end of said frame; a fixed guide member for the upper flight of each lower chain; an adjustable guide member for the lower flight of each upper chain, adjustable to exert stalk clamping pressure on the superimposed cross members passing therealong; fiber cleaning means supported on said frame in position such that the pairs of cross members and ramie stalks carried thereby pass through said cleaning means; and frame supported means for driving said carrier chains and said fiber cleaning means.

2. Ramie decorticating apparatus comprising a rectangular frame having substantially horizontal longitudinal and transverse members at the top and bottom thereof and vertical columns at the corners thereof extending between the top and bottom members; a chain carrier mounted on said frame comprising an upper pair and a lower pair of endless chains extending the full length of said frame with the lower flights of the upper chains adjacent upper flights of corresponding lower chains, and cross members connected at their ends to the two chains of each pair, said cross members being operative to clamp the butt end portions of ramie stalks fed into the apparatus and carry them, butt end first, through the apparatus; fiber cleaning means supported on said frame comprising various cleaning devices arranged in succession along the adjacent flights of said upper and lower carrier chains in position such that chain cross members carrying ramie stalks pass therethrough; and frame supported means for driving said carrier chains and said fiber cleaning means.

3. In a ramie fiber cleaning machine, a substantially rectangular frame comprising upper and lower longitudinal and transverse members and vertical columns at the frame corners extending between the upper and lower members; four substantially horizontal shafts journalled on the vertical columns at each end of said frame and vertically spaced to provide at each end of said frame one shaft adjacent the top of the frame, one shaft adjacent the bottom of the frame and two shafts adjacent the midheight position of the frame; a chain sprocket on each end of each shaft; four endless roller chains mounted on said sprockets in a manner to provide two upper chains and two lower chains with the lower flights of the upper chains adjacent the upper flights of the lower chains at corresponding sides of the frame; cross members extending between the two upper chains, and similar cross members extending between the two lower chains, said cross members being so spaced that upper and lower chain cross members are brought together as they enter the chain flights intermediate the height of the machine to engage and clamp the ramie stalks; a fixed guide member for the upper flight of each lower chain; and adjustable guide member for the lower flight of each upper chain, adjustable to exert stalk clamping pressure on the cross members passing along the chain guides; fiber cleaning means supported on said frame in position such that the cross members and ramie stalks carried thereby pass through said cleaning means; and frame carried means for driving said chain shafts and said fiber cleaning means.

4. A fiber cleaning machine as defined in claim 3 wherein a gear connection is provided between the intermediate chain shafts at at least one end of said frame to maintain said chains in synchronism so that corresponding cross members will come together in stalk clamping position as they enter the guided chain flights at the midheight of the frame, and wherein said driving means is operative to drive at least one of said chain shafts.

5. Decorticating apparatus comprising a rectangular frame; a pair of upper and a pair of lower roller chains supported on said frame in a manner to bring the lower flight of each upper chain in proximity to the upper flight of the corresponding lower chain at substantially the mid-height of the frame; means for guiding the chain flights at the mid-height of the frame; cross members extending between the two upper chains and similar cross members extending between the two lower chains, said cross members being secured to the corresponding chains by reversed chain roller pins at the ends of the cross members secured at their ends in wells provided in the ends of the cross members; fiber cleaning means supported on said frame in position such that cross members passing along the guided chain flights pass therethrough; and frame supported means for driving said chains and said fiber cleaning means.

6. In apparatus for cleaning vegetable fiber, a rectangular frame comprising top and bottom longitudinal and transverse members, and vertical columns at the frame corners extending between the top and bottom members; four transverse shafts at each end of said frame, journalled in bearings fixed to the frame and vertically spaced to provide a shaft at each end of said frame near the top thereof, a shaft at each end of said frame near the bottom thereof, and two shafts at each end of said frame near the midheight thereof; two chain sprockets on each shaft located one at each side of said frame within the space between said vertical columns; an upper pair of endless roller chains mounted on the sprockets of the four upper shafts; a lower pair of endless roller chains mounted on the sprockets of the four lower shafts; equally spaced cross-members extending between the two chains of each pair and carried thereby; guide means supporting the upper flights of the lower chains and the lower flights of the upper chains to hold a pair of cross members carried, one by said upper chains and one by said lower chains, in close proximity as they are carried by said chains lengthwise of said frame; means driving said two pair of chains in synchronism to maintain the cross-members of each pair of superimposed relationship as they pass along said guided chain flights; fiber cleaning units within said frame arranged in successive order along said guided chain flights for the passage of said cross-members therethrough; and frame supported means for driving said fiber-cleaning means.

7. Decorticating apparatus comprising a frame; carrier means movable lengthwise of said frame to grasp the butt end portions of vegetable stalks, such as ramie stalks, and carry said stalks butt end first through said frame; fiber cleaning means in said frame acting on said stalks as they are carried through said frame by said carrier means; a feed slot at the front end of said machine to locate said stalks in position to be grasped by said carrier means; and a feed control plate to the rear of said slot to position the butt ends of said stalks so that the butt end portions of all of said stalks will be grasped by said carrier means, said plate being spring urged to an upright operative position and movable by said carrier means to a position for passage thereby of said carrier means and stalks.

8. Vegetable fiber decorticating apparatus comprising a rectangular frame; shafts journalled on each end of said frame; chain sprockets on said shafts; frame carried means driving at least one of said shafts; chains on said sprockets arranged to provide a pair of upper and a pair of lower chains with the upper flight of each lower chain adjacent the lower flight of a corresponding upper chain near the mid-height of said frame and corresponding upper and lower chains located along the opposite inner sides of said frame; cross members connected at their ends to the two chains of each pair; means drivingly interconnecting at least two of said shafts associated one with one pair and the other with the other pair of said chains to maintain a cross member connected to one pair of chains in superimposed relationship with a cross member connected to the other pair of chains as the cross members move through said frame; fiber cleaning devices in said frame; and a feed slot and feed control plate mounted on the front end of said frame adjacent the mid-height thereof, said slot providing an opening of a size to limit the quantity of material fed into the machine at one time to an amount within the capacity of said cleaning devices; said feed control plate being disposed rearwardly of said feed slot; spring means urging said plate to slot closing position in which it functions as a stop to position material placed in said feed slot, said plate being movable away from said slot closing position by said chain cross members as they enter the chain flights at the mid-height of said frame.

9. Decorticating apparatus comprising a generally rectangular frame; a plurality of shafts journalled on each end of said frame; pulleys on said shafts; flexible members on said pulleys providing a pair of upper and a pair of lower flexible members; fixed guide means secured to said frame supporting the upper flights of the upper and lower flexible members; adjustable guide means mounted on said frame overlying the lower flight of each upper flexible member; idler means journalled on said frame supporting the lower flights of the lower flexible members; fiber cleaning devices disposed between an upper and lower flexible member on one side and an upper and lower flexible member on the opposite side; and cross members between the two flexible members of each pair operative to carry material to be cleaned through said fiber cleaning devices.

10. Ramie decorticating apparatus comprising a generally rectangular frame; flexible carrier means mounted on said frame including a pair of upper and a pair of lower flexible members having guided flights intermediate the height of said frame, and cross members between the two flexible members of each pair; and fiber cleaning means supported in said frame along said guided flights, said cross members being operative to clamp the butt end portions of ramie stalks and carry said stalks in a continuously clamped condition through said cleaning means, said cleaning means including a leaf stripper comprising a fixed substantially upright upper plate, and a tiltable lower plate spring urged to a position in which its upper edge is closely adjacent the lower edge of said upper plate; said lower plate being tiltable against spring pressure to permit the passage of said cross members and ramie stalks through said leaf stripper.

11. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including a leaf stripper comprising a fixed substantially upright upper plate, and a tiltable lower plate spring urged to a position in which its upper edge is closely adjacent the lower edge of said upper plate; said lower plate being tiltable against spring pressure to permit the passage of said cross members and ramie stalks through said leaf stripper, and dashpot means operatively connected with said lower plate to control the tilting movements thereof.

12. Ramie decorticating apparatus comprising a generally rectangular frame; chain carrier means mounted on said frame including a pair of upper end and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including two pair of stalk crushing rollers the bottom roller of each pair being journalled in bearings fixed to said frame and the top roller of each pair being journalled in movable bearings and being movable upwardly to permit passage of pairs of chain cross members between itself and the corresponding lower roller.

13. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including two pair of stalk crushing rollers, the bottom roller of each pair being journalled in bearings fixed to said frame and the top roller of each pair being journalled in bearings carried at the outer ends of a pair of arms mounted on a transverse shaft journalled at its ends in frame mounted bearings; and a spring connected between an arm on said transverse shaft and said frame to resiliently urge the top crushing roller downwardly against the corresponding bottom roller and permit the top roller to lift to permit pairs of chain cross members to pass between itself and the corresponding lower roller.

14. Stalk crushing means for a decorticating machine comprising two pair of crushing rollers arranged in tandem with the bottom roller of each pair journalled in fixed bearings; bearings for each upper roller carried at the outer ends of arms fixed to a respective shaft journalled in fixed bearings and having its axis substantially parallel to the roller axis; a spring connected at one end to a fixed connection and at its other end to the outer end of an arm extending from the corresponding shaft, effective to rotate said shaft in a direction to exert pressure on the upper roller; and hydraulic means connected to said shafts and mounted on fixed supports operative to control movements of the upper rollers by the associated springs to restrain said upper rollers against striking the corresponding lower rollers with stalk severing impact.

15. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including two pair of stalk crushing rollers, the bottom roller of each pair being journalled in bearings fixed to said frame and the top roller of each pair being journalled in movable bearings and being movable upwardly to permit passage of a pair of chain cross members between itself and the corresponding roller, and driving means for said crushing rollers driving said rollers at a peripheral speed slightly greater than the lineal speed of said chains to introduce slack in the ramie stalks passing through and beyond said crushing rollers to assist in peeling the bark from the interior parts of said stalks and avoid severing of the fiber in subsequent cleaning operations.

16. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including two pair of stalk crushing rollers, the bottom roller of each pair being journalled in bearings fixed to said frame and the top roller of each pair being journalled in bearings carried at the outer ends of a pair of arms mounted on a transverse shaft journalled at its ends in frame mounted bearings; a spring connected between an arm on said transverse shaft and said frame to resiliently urge the top crushing roller downwardly against the corresponding bottom roller and permit the top roller to lift to permit pairs of chain cross members to pass between itself and the corresponding lower roller, and a hydraulic dashpot operatively connected with each upper roller operative to retard downward movement of said rollers after passage of a pair of cross members thereby, said dashpots acting to retard the roller movement in a manner such that the rollers descend immediately behind the cross members but do not strike the corresponding lower rollers with fiber severing force.

17. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including two pair of stalk crushing rollers, the bottom roller of each pair being journalled in bearings fixed to said frame and the top roller of each pair being journalled in bearings carried at the outer ends of a pair of arms mounted on a transverse shaft journalled at its ends in frame mounted bearings; a spring connected between an arm on said transverse shaft and said frame to resiliently urge the top crushing roller downwardly against the corresponding bottom roller and permit the top roller to lift to permit pairs of chain cross members to pass between itself and the corresponding lower roller, and respective hydraulic damper means controlling movement of said top rollers under the force of the corresponding springs, each controlling means comprising a transverse frame member; a cylinder supported on said frame member; a piston slidable in said cylinder, a bar connected to the bearing carrying arms; a yoke connected to the upper end of said piston; adjustable length links connecting said yoke with said bar; and a pivotal connection between said cylinder and said frame member having its pivot axis substantially parallel to the roller axis.

18. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including a beater mechanism comprising a substantially vertically disposed lower plate; a pair of substantially vertically disposed upper plates spaced apart a distance somewhat greater than the thickness of said lower plate; power operated means imparting reciprocatory motion to said lower plate; means constraining the motion of said lower plate to substantially straight line motion; means supporting said upper plates for upward movement; means operated by said chain cross members to raise said upper plates for passage of said cross members thereby; spring means urging said upper plates downwardly; and hydraulic means controlling the downward movement of said upper plates.

19. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including a beater mechanism comprising a substantially vertically disposed lower plate; a pair of substantially vertically disposed upper plates spaced apart a distance slightly greater than the thickness of said lower plate; a guideway at each side of said frame; crossheads secured to the ends of said lower plate and to the ends of said pair of upper plates slidable in said guideways; power driven eccentrics operatively connected to said lower plate to impart reciprocatory movement thereto; and means operatively connected with said upper plates to raise said upper plates for the passage of said chain cross members between said upper and lower plates.

20. Ramie decorticating apparatus comprising a generally rectangular frame; chain carrier means mounted on said frame including a pair of upper and a pair of lower chains having guided flights intermedite the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means comprising upper and lower crushing rollers; means supporting the upper crusher roller for upward movement to permit passage of said chain cross members between said upper and lower rollers; a beater mechanism adjacent said crushing rollers comprising a lower plate, a pair of upper plates spaced apart a distance slightly greater than the thickness of said lower plate, guideways secured to said frame one at each side thereof, crossheads secured one to each end of said lower plate and one to each end of said pair of upper plates and slidable in corresponding guideways, a transverse shaft having eccentrics thereon, links connecting said eccentrics with said lower plate to impart reciprocatory movement thereto, means including a pair of arms journalled on said transverse shaft, connected to said upper plates and operatively associated with an upper crushing roller to raise said upper plates for passage of said chain cross members between said upper and lower plates, and spring means connected to said upper plates returning them to their normal operative position after passage of chain cross members thereby.

21. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means comprising upper and lower crushing rollers; means supporting the upper crusher roller for upward movement to permit passage of said chain cross members between said upper and lower rollers; a beater mechanism adjacent said crushing rollers comprising a lower plate, a pair of upper plates spaced apart a distance slightly greater than the thickness of said lower plate, guideways secured to said frame one at each side thereof, crossheads secured one to each end of said lower plate and one to each end of said pair of upper plates and slidable in corresponding guideways, a transverse shaft having eccentrics thereon, links connecting said eccentrics with said lower plate to impart reciprocatory movement thereto, means including a pair of arms supported on said transverse shaft and connected to said upper plates, and a roller mounted on each arm and resting on said upper crushing roller to raise said upper plates for passage of chain cross members between said upper and lower plates, spring means exerting a downwardly directed force on said upper plates, and hydraulic means connected to said upper plates controlling the downward movement thereof under the force of said spring means.

22. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means; said cleaning means comprising upper and lower crushing rollers; means supporting the upper crusher roller for upward movement to permit passage of said chain cross members between said upper and lower rollers; a beater mechanism adjacent said crushing rollers comprising a lower plate, a pair of upper plates spaced apart a distance slightly greater than the thickness of said lower plate, guideways secured to said frame one at each side thereof, crossheads secured one to each end of said lower plate and one to each end of said pair of upper plates and slidable in corresponding guideways, a transverse shaft having eccentrics thereon, links connecting said eccentrics with said lower plate to impart reciprocatory movement thereto, means including a pair of arms supported on said transverse shaft and connected to said upper plates, and a roller mounted on each arm and resting on said upper crushing roller to raise said upper plates for passage of chain cross members between said upper and lower plates, spring means exerting a downwardly directed force on said upper plates, hydraulic means connected to said upper plates controlling the downward movement thereof under the force of said spring means, and a flange on said upper plates extending toward said upper crushing roller to restrain said upper plates against returning to a position in which they would interfere with said cross members before passage of said cross members thereby.

23. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including bark cleaning mechanism comprising two fluted rollers spaced apart longitudinally of said frame and journalled in bearings fixed to said frame; a head for each roller; and means supporting said heads for movement away from the respective rollers for passage of the chain cross members between the heads and rollers.

24. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including bark cleaning mechanism comprising two fluted rollers spaced apart longitudinally of said frame and journalled in bearings fixed to said frame; a head for each roller; and means supporting said heads for movement away from the respective rollers for passage of the chain cross members between the heads and rollers, each head supporting means comprising a transverse shaft; a pair of arms on said shaft secured at their outer ends to the respective head; a crank arm on said shaft; spring means connected to the crank arm to move the head toward the corresponding roller; and a hydraulic check device connected to each head controlling movement thereof toward the corresponding roller.

25. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including bark cleaning mechanism comprising two fluted rollers spaced apart longitudinally of said frame and journalled in bearings fixed to said frame; a head for each roller; means supporting said heads for movement away from the respective rollers for passage of the chain cross members between the heads and rollers; and adjustable limit stops carried by each head to provide adjustable clearance between the heads and rollers.

26. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including bark cleaning mechanism comprising two fluted rollers spaced apart longitudinally of said frame and journalled in bearings fixed to said frame; a head for each roller; and means supporting said heads for movement away from the respective rollers for passage of the chain cross members between the heads and rollers, each head supporting means comprising a transverse shaft; a pair of arms secured on said shaft and secured at their outer ends to the respective head and having cam portions thereon engageable by chain cross members to move the heads away from the respective rollers; spring means operative to move said heads toward the respective rollers; and hydraulic check devices controlling the movement of the heads toward the rollers operative to restrain the heads from striking the rollers.

27. Ramie decorticating apparatus comprising a generally rectangular frame; chain carrier means mounted on said frame including a pair of upper and a pair of lower chains having guided flights intermediate the height of said frame and cross members between the two chains of each pair; fiber cleaning means supported in said frame along said guided chain flights, said cross members being operative to clamp the butt end portions of ramie stalks and carry said stalks in a continuously clamped condition through said cleaning means, said cleaning means including a leaf stripper, upper and lower crushing rollers, a beater mechanism, and bark cleaning mechanism; and means for moving a portion of the leaf stripper mechanism, the upper of said crusher rollers, a portion of said beater mechanism, and portions of said bark cleaning mechanism in succession as a pair of chain carried cross members progresses along the guided chain flights for the successive passage of said cross members through said successively arranged cleaning devices.

28. Ramie decorticating apparatus comprising a generally rectangular frame; chain carrier means mounted on said frame including a pair of upper and a pair of lower chains having guided flights intermediate the height of said frame, and cross members between the two chains of each pair; and fiber cleaning means supported in said frame along said guided chain flights, said cross members being operative to clamp the butt end portions of ramie stalks and carry said stalks in a continuously clamped condition through said cleaning means, said cleaning means including a leaf stripper comprising a fixed, substantially upright upper plate, and a tiltable lower plate spring urged to a position in which its upper edge is closely adjacent the lower edge of said upper plate; said lower plate being tiltable against spring pressure to permit the passage of said cross members and ramie stalks through said leaf stripper, crushing rollers immediately to the rear of said leaf stripper, a beater to the rear of said crushing rollers, a first bark scraping roller to the rear of said beater and a second bark scraping roller to the rear of said first bark scraping roller and a movable head operatively associated with each bark scraping roller; and means interconnecting the movable head associated with said second bark scraping roller and the tiltable plate of said leaf stripper operative to tilt said plate upon movement of said head to permit passage of a pair of chain cross members past the second leaf scraping roller to dump any leaf and top material held by the leaf stripper before entry of a succeeding pair of cross members through said leaf stripper.

29. In ramie decorticating apparatus a frame; fiber cleaning means supported in said frame including a leaf stripper and a bark scraper, said stripper and scraper being spaced along said frame a distance substantially equal to the maximum length of ramie stalks fed to the apparatus; means movable along said frame for carrying ramie stalks through said leaf stripper and bark scraper, and means actuated by the passage of said stalk carrying means through said bark scraper to open said leaf stripper and discharge therefrom any leaf material held by said stripper after the passage of a group of stalks therethrough.

30. Ramie decorticating apparatus comprising a generally rectangular frame; carrier means mounted on said frame including a pair of upper and a pair of lower flexible members having guided flights intermediate the height of said frame and cross members spaced apart a distance slightly greater than the length of ramie stalks fed into said apparatus; and fiber cleaning means supported in said frame along said guided flights, said cross members being operative to clamp the butt end portions of ramie stalks and carry said stalks in a continuously clamped condition through said cleaning means.

31. In apparatus for cleaning ramie fiber a generally rectangular elongated frame, chain carrier means mounted on said frame including a pair of upper and a pair of lower chains having substantially horizontal guided flights intermediate the height of said frame and cross members between the two chains of each pair; and fiber cleaning means supported in said frame along said substantially horizontal guided chain flights including leaf stripping mechanism, upper and lower crushing rollers, beater mechanism and bark cleaning mechanism comprising two rollers spaced apart longitudinally of said frame with a movable head above the first roller and a movable head below the second roller, said cross members being operative to clamp the butt end portions of ramie stalks and carry said stalks in a continuously clamped condition horizontally through said cleaning devices in succession.

32. Ramie decorticating apparatus comprising a generally rectangular frame, chain carrier means mounted on said frame including a pair of upper and a pair of lower chains having guided flights intermediate the height of said frame and cross members between the two chains of each pair; fiber cleaning means supported in said frame along said guided chain flights including a leaf stripper, upper and lower crushing rollers, beater mechanism, a first scraper roller, a movable head immediately above and operatively associated with said scraper roller, a second scraper roller spaced longitudinally of said frame from said first scraper roller, a second movable head immediately below and operatively associated with said second scraper roller; means operative to move said second head downwardly for passage of said cross members between said head and the associated scraper roller, spring means connected to said second head to return it to a position adjacent to the associated scraper roller; a lever having intermediate its length a fulcrum fixed relative to said frame and connected at one end to said second head; and a hydraulic dashpot interconnected between the opposite end of said lever and said frame to control movements of said second head under the force exerted by said spring means to restrain the head against striking the associated roller.

33. Ramie decorticating apparatus comprising a generally rectangular frame; chain carrier means mounted on said frame including a plurality of transverse shafts at each end of said frame, chain sprockets on said shafts, a pair of upper and a pair of lower chains mounted on said sprockets and extending lengthwise of said frame and having flights intermediate the height of said frame, guide means for said intermediate chain flights secured to said frame, cross members between the two chains of each pair, means drivingly connecting the two pair of chains to bring corresponding cross members into superimposed relationship as they enter said guided chain flights to clamp butt end portions of ramie stalks and carry said stalks in a continuously clamped condition through said apparatus; a feed slot and a feed control plate secured to the front end of said frame; and fiber cleaning means supported in said frame along said guided chain flights including a leaf stripper immediately to the rear of said feed control plate comprising a fixed substantially upright upper plate, and a tiltable lower plate spring urged to a position in which its upper edge is closely adjacent the lower edge of said upper plate, said lower plate being tiltable against spring pressure to permit the passage of said cross members and ramie stalks through said leaf stripper, and dashpot means operatively connected with said lower plate to control the tilting movements thereof; two pair of crushing rollers disposed to the rear of said leaf stripper, each pair comprising a lower roller journalled in bearings fixed to the frame and an upper roller supported for upward movement for the passage of said cross members between the upper and lower rollers of each pair, spring means resiliently urging the upper rollers toward the lower rollers and a respective dashpot operatively connected with each upper roller to control the spring urged movement thereof; a beater mechanism immediately to the rear of the last pair of crushing rollers comprising a lower plate, a pair of upper plates spaced apart to receive the upper edge of the lower plate between the lower edges thereof, means supporting said lower plate for reciprocatory movement, means for supporting said upper plates for upward movement for the passage of cross members between the lower and the upper plates, spring means urging the upper plates to their lower position and a hydraulic dashpot operatively connected with the upper plates to control the spring urged movements thereof; a first scraper mechanism immediately to the rear of said beater mechanism comprising a vaned roller journalled in bearings fixed to said frame and a head for said roller disposed immediately above the roller and supported for upward movement for passage of cross members between the roller and the head, spring means resiliently urging the head to an operative position adjacent the roller, adjustable limit stops for adjusting the space between the head and the roller and a hydraulic dashpot operatively connected to the head to control movements of the head toward the roller; and a second scraper roller journalled in bearings fixed to said frame, a second head immediately below and operatively associated with said second scraper roller, means connected with said head operative to move the head away from the roller for passage of cross members between said second head and second scraper roller and a hydraulic dashpot operatively connected with said second head to control the movements of said second head toward the second scraper roller.

34. Ramie decorticating apparatus comprising a generally rectangular frame; chain carrier means mounted on said frame including a plurality of transverse shafts at each end of said frame, sprockets on said shafts, a pair of upper and a pair of lower chains mounted on said sprockets and cross members between the two chains of each pair having ramie gripping means thereon; fiber cleaning means supported in said frame along said chain flights; means for driving said chains and said cleaning means whereby ramie is presented to said cleaning means and subjected to action thereby and chain covers enclosing the lower flights of said lower pair of chains.

35. Ramie decorticating apparatus comprising a generally rectangular frame; chain carrier means mounted on said frame including a plurality of transverse shafts at each end of said frame, sprockets on said shafts, a pair of upper and a pair of lower chains mounted on said sprockets and cross members between the two chains of each pair having ramie gripping means thereon; and fiber cleaning means supported in said frame along said chain flights, means for driving said chains and cleaning means whereby ramie is presented to said cleaning means and subjected to action thereby, said chains each having a number of links which is an even multiple of 4 and 5 so that the number of cross members secured to each pair of chains can be changed to accommodate the apparatus to different ramie stalk lengths, and equal spacing between said cross members can be retained.

36. In a ramie decorticating apparatus a machine section comprising an elongated generally rectangular frame structure; chain carrier means mounted on said frame structure including a pair of upper and a pair of lower chains having guided flights intermediate the height of said frame structure and cross members between the two chains of each pair having ramie gripping means thereon; means for driving said chains; fiber cleaning means supported in said frame structure along said guided chain flights; and means for driving said cleaning means whereby ramie is presented to said cleaning means and subjected to action thereby.

37. Ramie decorticating apparatus comprising an elongated generally rectangular frame; chain carrier means mounted on said frame including a plurality of shafts mounted on each end of said frame, sprockets on said shafts and a pair of upper and a pair of lower chains mounted on said sprockets having guided flights intermediate the height of said frame and cross members between the two chains of each pair operative to clamp the butt end portions of ramie stalks and carry said stalks in a continuously clamped condition through said frame; fiber cleaning means supported in said frame along said guided chain flights operative to clean the portions of ramie stalks extending from said cross members; and means in said frame to the rear of said fiber cleaning means for cleaning the end portions of said stalks held in said cross members, said end cleaning means comprising a reciprocating clamp for reclamping the stalks as they are released by said cross members; and a cleaning roller and a head therefor at the end of said machine so located that the butt end portions of said stalks are fed into and withdrawn from said rear cleaning roller and head by said reciprocating clamp.

38. Ramie decorticating apparatus comprising an elongated generally rectangular frame; chain carrier means mounted on said frame including a plurality of shafts mounted on each end of said frame, sprockets on said shafts and a pair of upper and a pair of lower chains mounted on said sprockets having guided flights intermediate the height of said frame and cross members between the two chains of each pair operative to clamp the butt end portions of ramie stalks and carry said stalks in a continuously clamped condition through said frame; fiber cleaning means supported in said frame along said guided chain flights operative to clean the portions of ramie stalks extending from said cross members; and means in said frame to the rear of said fiber cleaning means for cleaning the end portions of said stalks held in said cross members, said end cleaning means comprising a reciprocating clamp for reclamping the stalks as they are released by said cross members; and a cleaning roller and a head therefor at the end of said machine so located that the butt end portions of said stalks are fed into and withdrawn from said rear cleaning roller and head by said reciprocating clamp, said reciprocating clamp means comprising slideways secured to said frame, a crosshead slidably mounted on said slideways, a pair of arms fixed to said crosshead carrying at their outer ends a lower clamp bar, a pair of arms pivoted to said crosshead and carrying at their outer ends an upper clamp bar, cam means operated by movement of said cross head along said slideways to move said clamp bars apart, spring means connected with said upper arms and operative upon movement of said crosshead along said slideways to move said clamp bars together, and means for reciprocating said crosshead in timed sequence with the passage of chain cross members past said arm carried upper and lower clamp bars.

39. Ramie decorticating apparatus comprising an elongated generally rectangular frame; chain carrier means mounted on said frame including a plurality of shafts mounted on each end of said frame, sprockets on said shafts and a pair of upper and a pair of lower chains mounted on said sprockets having guided flights intermediate the height of said frame and cross members between the two chains of each pair operative to clamp the butt end portions of ramie stalks and carry said stalks in a continuously clamped condition through said frame; fiber cleaning means supported in said frame along said guided chain flights operative to clean the portions of ramie stalks extending from said cross members; and means in said frame to the rear of said fiber cleaning means for cleaning the end portions of said stalks held in said cross members, said end cleaning means comprising a reciprocating clamp for reclamping the stalks as they are released by said cross members; and a cleaning roller and a head therefor at the end of said machine so located that the butt end portions of said stalks are fed into and withdrawn from said rear cleaning roller and head by said reciprocating clamp, said reciprocating clamp means comprising slideways secured to said frame, a crosshead slidably mounted on said slideways, a pair of arms fixed to said crosshead carrying at their outer ends a lower clamp bar, a pair of arms pivoted to said crosshead and carrying at their outer ends an upper clamp bar, cam means operated by movement of said crosshead along said slideways to move said clamp bars apart, spring means connected with said upper arms and operative upon movement of said crosshead along said slideways to move said clamp bars together, and driving means for reciprocating said crosshead in timed sequence with the passage of chain cross members past said reciprocable clamp bars comprising a crank shaft journalled in bearings secured to said frame; a one revolution clutch having one portion secured to said crank shaft and the other portion drivingly connected with a power source, and cam means operatively associated with said clutch for engaging the clutch as the chain cross bars pass a predetermined frame location.

40. In ramie decorticating apparatus an elongated rectangular frame, chain carrier means mounted on said frame including cross members movable in superimposed relationship along guided chain flights intermediate the height of said frame to clamp the butt end portions of ramie stalks and carry said stalks in a continuously clamped condition through said frame; fiber cleaning means supported in said frame along said guided chain flights arranged for passage therethrough of said cross members and ramie stalks carried thereby; and means for cleaning the butt end portions of said stalks clamped by said cross members comprising cleaning means operatively mounted on the rear end of said frame, reciprocable clamp means operative to grasp the cleaned portions of the ramie stalks adjacent the cross members immediately prior to the time the stalks are released by the cross members and to feed the cross member clamped portions of said stalks into said end cleaning means and withdraw them therefrom, and means for operating said reciprocable clamp means comprising a crank shaft mounted transversely of said frame, a drive for said crank shaft, a clutch for intermittently connecting said crank shaft with said drive, and a means for engaging and disengaging said clutch comprising a clutch actuating lever extending transversely of the clutch, a lever pivoted to the frame and having a cam thereon engageable with an end of said clutch actuating lever to disengage the clutch when the actuating lever rides up on the cam, a transverse shaft journalled on said frame and having an arm thereon positioned for contact by said chain cross members to rotate said shaft through a small angle, spring means restoring said shaft to its normal position, a second arm on said shaft connected with the free end of said cam lever and operative to displace said cam from the end of said clutch actuating arm to permit the clutch to engage, said spring returning the cam lever to a position to intercept the end of the clutch actuating lever and disengage the clutch when the crank shaft has made a complete revolution.

41. In ramie decorticating apparatus an elongated rectangular frame, carrier means including chains supported on said frame and cross members secured thereto at opposite sides of said frame for clamping the butt end portions of ramie stalks and carry them through said frame in a continuously clamped condition; fiber cleaning means in said frame through which said cross members and ramie stalks pass and which clean the portions of said stalks projecting from the clamping cross members; means supported in said frame for reclamping the stalks adjacent the portions clamped by said cross members immediately prior to release of the stalks by the cross members and means on the rear end of said frame for cleaning the cross member clamped portion of the stalks when said portions are fed into and withdrawn therefrom by said reclamping means, said end cleaning means comprising a scraping roller journalled in bearings fixed at the rear end of said frame, said roller having angularly spaced longitudinally extending radial vanes, and a head for said roller having adjacent the roller a concave surface, and supporting members fixed to said frame and secured to the ends of said head supporting said head in operative position relative to said roller.

42. Ramie decorticating apparatus comprising an elongated substantially rectangular frame structure; means for carrying ramie stalks through said frame in a continuously clamp condition including transverse shafts at each end of said frame, sprockets on said shafts, chains on said sprockets arranged in an upper and a lower pair with the chains of each pair disposed adjacent corresponding sides of said frame, and cross members between the two chains of each pair equally spaced along the length of said chains; guide means for the lower flights of the upper chains and for the upper flights of the lower chains and means drivingly interconnecting said two pairs of chains to hold each pair of upper and lower chain cross members in superimposed stalk clamping relationship as they pass along the guided chain flights; a feed mechanism at the front end of said frame operative to present the butt end portions of ramie stalks for clamping by said cross members as they enter said guided chain flights; fiber cleaning means supported by said frame along said guided chain flights operative to clean the ramie fiber in a direction away from said cross members; reciprocable clamp means in the rearward portion of said frame operative to clamp the fiber as the butt end portions of the stalks are released by the cross members on leaving said guided chain flights; cleaning means on the rear end of said frame operative to clean the butt end portions of ramie stalks fed thereto by said reciprocable clamp means; and frame supported means operative to remove the cleaned fiber from said reciprocable clamp means.

43. Ramie decorticating apparatus comprising an elongated substantially rectangular frame structure; means for carrying ramie stalks through said frame in a continuously clamped condition including transverse shafts at each end of said frame, sprockets on said shafts, chains on said sprockets arranged in an upper and a lower pair with the chains of each pair disposed adjacent corresponding sides of said frame, and cross members between the two chains of each pair equally spaced along the lengths of said chains; guide means for the lower flights of the upper chains and for the upper flights of the lower chains and means drivingly interconnecting said two pairs of chains to hold each pair of upper and lower chain cross members in superimposed stalk clamping relationship as they pass along the guided chain flights; a feed mechanism at the front end of said frame operative to present the butt end portions of ramie stalks for clamping by said cross members as they enter said guided chain flights; fiber cleaning means supported by said frame along said guided chain flights operative to clean the ramie fiber in a direction away from said cross members; reciprocable clamp means in the rearward portion of said frame operative to clamp the fiber as the butt end portions of the stalks are released by the cross members on leaving said guided chain flights; cleaning means on the rear end of said frame operative to clean the butt end portions of ramie stalks fed thereto by said reciprocable clamp means; and frame supported means operative to remove the cleaned fiber from said reciprocable clamp means, said butt end cleaning means comprising a roller having longitudinally extending radially projecting vanes thereon, journalled in fixed bearings at the rear end of said frame, a head for said roller having a concave surface adjacent the roller, bracket means supporting the head, and means operatively associated with said head adjustably controlling the clearance between said head and said roller.

44. In ramie decorticating apparatus an elongated rectangular frame; carrier means mounted on said frame comprising transverse shafts journalled in bearings secured to the ends of said frame; chain sprockets on said shafts; chains on said sprockets arranged in an upper pair and a lower pair with the upper flights of the lower chains adjacent the lower flights of the upper chains; cross members secured between the two chains of each pair; means drivingly interconnecting said upper pair and said lower pair of chains to maintain a lower chain cross member in superimposed relationship to an upper chain cross member in passing along said adjacent chain flights, and means guiding said adjacent chain flights to apply stalk clamping pressure to said cross members; fiber cleaning devices supported in said frame along said adjacent chain flights comprising leaf stripping mechanism, crushing rollers, beating mechanism, a lower scraper roller, an upper scraper roller, reciprocatory clamp mechanism and an end cleaning roller; and driving means for said carrier mechanism and said cleaning devices comprising a transverse drive shaft journalled on the top of said frame, means driving said shaft, a driving connection including speed reducing mechanism between said drive shaft and at least one of said chain shafts, a driving connection between one of said chain shafts and said crushing rollers driving said rollers at a speed slightly greater than the lineal speed of said carrier chains, a driving connection between said drive shaft and said beater mechanism, a driving connection between said drive shaft and said lower scraper roller, a reverse drive shaft journalled on said frame, reversing gears between said drive shaft and said reverse drive shaft and a driving connection between said reverse drive shaft and said upper scraper rollers, a driving connection between one of said carrier chain shafts and said reciprocatory clamp mechanism, and frame supported means driving said end cleaning roller.

45. In ramie decorticating apparatus a generally rectangular elongated frame; carrier means mounted on said frame and operative to carry ramie stalks in a continuously clamped condition throughout the length of the frame; fiber cleaning means supported on said frame operative to clean the portions of the stalks extending from said carrier means; reciprocating clamp means to the rear of said fiber cleaning means operative to reclamp the ramie adjacent the carrier clamping means; an end cleaning means at the rear end of the frame so positioned that the end portions of the ramie stalks are fed into and withdrawn from said end cleaning means by ricprocatory clamping means, said reciprocatory clamping means including an upper and a lower bar extending transversely of said frame, at least one of said bars having a facing of resilient material to prevent injury to the cleaned ramie fiber by said reciprocatory clamping means.

46. In ramie decorticating apparatus an elongated rectangular frame, carrier means including chains supported on said frame and cross members secured thereto at opposite sides of said frame for clamping the butt end portion of ramie stalks and carrying them through said frame in a continuously clamped condition; fiber cleaning means in said frame through which said cross members and ramie stalks pass and which clean the portions of said stalks projecting from the clamping cross members; means supported in said frame for reclamping the stalks adjacent the portions clamped by said cross members immediately prior to release of the stalks by the cross members; and means on the rear end of said frame for cleaning the cross member clamped portion of the stalks when said portions are fed into and withdrawn therefrom by said reclamping means, said end cleaning means comprising a rotary scraper journalled in bearings at the rear end of said frame, said scraper having angularly spaced longitudinally extending radial vanes; and a head for said scraper having adjacent the scraper a concave surface secured to said frame supporting said head, and adjustable means between said head and said head supporting brackets for controlling the clearance between said head and said end cleaning scraper.

47. Ramie decorticating apparatus comprising a generally rectangular elongated frame; carrier means supported on said frame including a pair of upper and a pair of lower chains extending the length of said frame with the lower flights of said upper chains adjacent the upper flights of said lower chains at substantially the midheight of said frame, cross members connecting the two chains of each pair, means drivingly interconnecting the two pairs of chains to maintain said cross members in superimposed relationship as they pass along said adjacent chain flights and a guide means for said adjacent chain flights maintaining said cross members in stalk clamping condition; feeding means at the front of said frame operative to present the butt ends of ramie stalks to said chain cross members to be clamped thereby and carried through said frame; and fiber cleaning means supported by said frame along said adjacent chain flights including leaf stripping mechanism, crushing rollers, beater mechanism, a lower bark cleaning roller, and a head cooperating therewith, and an upper bark cleaning roller and a cooperating head, and means driving said two bark cleaning rollers in opposite directions to remove the bark from the upper and lower sides of the ramie fiber and to also dislodge any stalk material adhering to the fiber after its passage through said beating mechanism.

48. Ramie decorticating apparatus comprising a generally rectangular elongated frame, chain carrier means for clamping ramie stalks at their butt ends and carrying them in continuously clamped condition through said frame, said carrier means comprising a pair of upper and a pair of lower chains supported on said frame with the upper flights of the lower chains adjacent the lower flights of the upper chains, cross members extending between the two chains of each pair and means maintaining said cross members in superimposed stalk clamping relationship as they pass along said adjacent chain flights, said cross members having longitudinally corrugated surfaces contacting said stalks; and fiber cleaning means carried by said frame along said adjacent chain flights operative to remove leaf and stalk material from the ramie fiber as the stalks are carried through said cleaning means by said chain carrier means.

49. Apparatus for cleaning ramie fiber comprising a frame, chain carrier means mounted on said frame including a pair of upper and a pair of lower chains with the lower flights of the upper chains, adjacent the upper flights of the lower chains, cross members extending between the two chains of each pair and means for maintaining said cross members in superimposed stalk clamping relationship as they pass along said adjacent chain flights; and fiber cleaning means supported by said frame along said adjacent chain flights including a leaf stripping device, two pair of upper and lower crushing rollers, a beater mechanism including a pair of spaced upper plates and a reciprocatory lower plate, a lower scraper roller and head therefor, and an upper scraper roller and head therefor, said leaf stripping mechanism, said upper crusher rollers, said pair of parallel beater mechanism plates and said lower scraper roller head being movable in succession for the passage of pairs of chain cross members thereby and movable to return to their normal operative positions immediately upon the passage of a pair of cross members thereby.

50. Ramie decorticating apparatus comprising a generally rectangular elongated frame; carrier means supported on said frame including a pair of upper and a pair of lower chains extending the length of said frame with the lower flights of said upper chains adjacent the upper flights of said lower chains at substantially the midheight of said frame, cross members connecting the two chains of each pair, means drivingly interconnecting the two pairs of chains to maintain said cross members in superimposed relationship as they pass along said adjacent chain flights and a guide means for said adjacent chain flights maintaining said cross members in stalk clamping condition; feeding means at the front of said frame operative to present the butt ends of ramie stalks to said chain cross members to be clamped thereby and carried through said frame; and fiber cleaning means supported by said frame along said adjacent chain flights including leaf stripping mechanism, crushing rollers, beater mechanism, a lower bark cleaning roller and a head cooperating therewith, and an upper bark cleaning roller and a cooperating head, and means driving said two bark cleaning rollers in opposite directions to remove the bark from the upper and lower sides of the ramie fiber and to also dislodge any stalk material adhering to the fiber after its passage through said beater mechanism, driving means for said bark cleaning rollers driving said rollers at high speed, and a fly wheel secured to each roller at one end thereof to maintain substantially uniform rotation of said rollers at said high speed.

51. Apparatus for cleaning ramie fiber comprising a generally rectangular elongated frame; carrier means supported on said frame comprising a plurality of transverse shafts journalled in bearings secured to the opposite ends of said frame, chain sprockets on said shaft, chains on said sprockets arranged to provide a pair of upper and a pair of lower chains with the lower flights of the upper chains adjacent the upper flights of corresponding lower chains intermediate the height of said frame, cross members connecting the two chains of each pair, and means maintaining said cross members in superimposed stalk clamping relationship as they pass along said adjacent chain flights; means for driving said chains; fiber cleaning means supported by said frame along said intermediate chain flights including upper and lower crushing rollers, a bearing mechanism having a reciprocating portion and a liftable portion, a lower scraper roller and a cooperating head positioned immediately above it, and an upper scraper roller and a cooperating head positioned immediately below it, and hydraulic means operatively connected with said upper crusher roller, the liftable portion of said beater mechanism and the heads associated with said lower and upper scraper rollers operative to move said upper crusher roller, the movable portion of said beater mechanism and said scraper roller heads to a position in which they are clear of the pairs of chain cross members as the pairs of cross members pass thereby.

52. Apparatus for cleaning ramie fiber comprising a generally rectangular elongated frame; carrier means supported on said frame comprising a plurality of transverse shafts journalled in bearings secured to the opposite ends of said frame, chain sprockets on said shafts, chains on said sprockets arranged to provide a pair of upper and a pair of lower chains with the lower flights of the upper chains adjacent the upper flights of corresponding lower chains intermediate the height of said frame, cross members connecting the two chains of each pair, and means maintaining said cross members in superimposed stalk clamping relationship as they pass along said adjacent chain flights; means for driving said chains; fiber cleaning means supported by said frame along said intermediate chain flights including upper and lower crushing rollers, a beating mechanism having a reciprocating portion and a liftable portion, a lower scraper roller and a cooperating head positioned immediately above it, and an upper scraper roller and a cooperating head positioned immediately below it; and hydraulic means operatively connected with said upper crusher roller, the liftable portion of said beater mechanism and the heads associated with said lower and upper scraper rollers operative to move said upper crusher roller, the movable portion of said beater mechanism and said scraper roller heads to a position in which they are clear of the pair of chain cross members as said cross members pass thereby, said hydraulic mechanism including a source of hydraulic pressure, respective hydraulic jack devices operatively connected with said crusher rollers, said beater mechanism and the heads of said scraper rollers, and hydraulic valve mechanism interconnected between said source of pressure and said jacks and actuated by said chain cross members to successively move said crusher rollers, said beater mechanism, and said scraper roller heads for the passage of said chain cross members thereby.

53. Apparatus for cleaning ramie fiber comprising a generally rectangular elongated frame; carrier means supported on said frame comprising a plurality of transverse shafts journalled in bearings secured to the opposite ends of said frame, chain sprockets on said shafts, chains on said sprockets arranged to provide a pair of upper and a pair of lower chains with the lower flights of the upper chains adjacent the upper flights of corresponding lower chains intermediate the height of said frame, cross members connecting the two chains of each pair and means maintaining said cross members in superimposed stalk clamping relationship as they pass along said adjacent chain flights; means for driving said chains; fiber cleaning means supported by said frame along said intermediate chain flights including upper and lower crushing rollers, a beating mechanism having a reciprocating portion and a liftable portion, a lower scraper roller and a cooperating head positioned immediately above it and an upper scraper roller and a cooperating head positioned immediately below it; and hydraulic means operatively connected with said upper crusher roller, the liftable portion of said beater mechanism and the heads associated with said lower and upper scraper rollers operative to move said upper crusher roller, the movable portion of said beater mechanism and said scraper roller heads to a position in which they are clear of said pairs of chain cross members as said pairs of cross members pass thereby, and mechanical means actuated directly by said chain cross members for moving said crusher rollers, said beater mechanism portion, and said scraper roller heads for passage of said cross members in the event of failure of hydraulic pressure to said hydraulic mechanism.

54. Apparatus as described in claim 52 wherein said hydraulic jack devices are double acting and operate to apply hydraulic pressure to return said crusher rollers, beater mechanism portion and scraper roller heads to their operative position and maintain them in such position under hydraulic pressure.

55. Apparatus for cleaning vegetable fiber comprising a supporting frame; fiber cleaning means supported on said frame; carrier means supported on said frame having parts passing through said cleaning means to carry clamped vegetable stalks through said cleaning means; hydraulic apparatus operatively associated with said cleaning means to move parts of said cleaning means out of the way of said carrier parts as said carrier parts pass through said cleaning means, a source of hydraulic pressure, means including a valve for controlling the application of hydraulic pressure to said hydraulic apparatus and actuating means for said valve disposed in the path of movement of a part of said carrier means whereby said hydraulic apparatus is operated in timed relation to the movement of said carrier means.

56. In ramie decorticating apparatus a generally rectangular elongated frame, frame supported carrier means operative to clamp the butt end portions of ramie stalks and carry said stalks in continuously clamped condition through said frame; frame supported cleaning means for removing all stalk and bark material from the ramie fiber extending from the carrier means, and cleaning means for removing stalk and bark material from the fiber in the butt end portions of the stalks; reciprocable clamping means carried by said frame operative to clamp the fiber adjacent the stalk portions clamped by said carrier means as the stalks are released by the carrier means, to feed the butt end portions of the stalks into the end cleaning means and withdraw them therefrom; hydraulic mechanism operatively connected between said frame and said reciprocable clamping means to operate said reciprocable clamping means, a source of hydraulic pressure, means hydraulically connecting said mechanism with said source of pressure, and a control valve in said connecting means actuated by said carrier means to effect a single reciprocation of said reciprocatory clamp means each time the carrier means releases ramie stalks at the rear end of said frame.

57. Ramie decorticating apparatus comprising an elongated rectangular frame, means supported on said frame for clamping ramie stalks adjacent their butt ends and carrying them through said frame in continuously clamped condition, means carried by said frame for cleaning the stalk portions of the ramie extending from said clamping means, means for cleaning the butt ends of said ramie including relatively movable reciprocating clamp members and a cooperating rotary scraper mounted at the rear end of said frame, said reciprocating clamp members operating in timed relation to said first clamping means and clamping said ramie stalks upon release thereof by said first clamping means and presenting said butt ends to said scraper for cleaning thereby.

58. Ramie decorticating apparatus comprising an elongated rectangular frame, means supported on said frame for clamping ramie stalks adjacent their butt ends and carrying them through said frame in continuously clamped condition, means carried by said frame for cleaning the stalk portions of the ramie extending from said clamping means, means for cleaning the butt ends of said ramie including relatively movable reciprocating clamp members and a cooperating rotary scraper mounted at the rear end of said frame, said reciprocating clamp members operating in timed relation to said first clamping means for clamping said ramie stalks upon release thereof by said first clamping means and presenting said butt ends to said scraper and withdrawing them therefrom for cleaning thereby and a conveyor having one end disposed below said reciprocating clamp means for removing the cleaned fiber from said decorticating apparatus.

WILLIAM E. WRIGHT.

References Cited in the file of this patent

UNITED STATES PATENTS

| Number | Name | Date |
|---|---|---|
| 355,188 | Lycan | Dec. 28, 1886 |
| 738,893 | Ellis | Sept. 15, 1903 |
| 915,125 | Summers | Mar. 16, 1909 |
| 1,023,152 | Hollier | Apr. 16, 1912 |
| 1,054,752 | Coulon | Mar. 4, 1913 |
| 1,308,267 | Stewart | July 1, 1919 |
| 1,405,004 | Roberts | Jan. 31, 1922 |
| 1,722,164 | Waddell et al. | July 23, 1929 |
| 2,118,071 | Decuypere et al. | May 24, 1938 |
| 2,263,591 | Patterson | Nov. 25, 1941 |
| 2,282,652 | Henning | May 12, 1942 |
| 2,288,652 | Simons | July 7, 1942 |
| 2,399,317 | Bigelow | Apr. 30, 1946 |